US011294891B2

(12) United States Patent
Aggarwal et al.

(10) Patent No.: US 11,294,891 B2
(45) Date of Patent: Apr. 5, 2022

(54) INTERACTIVE SEARCH EXPERIENCE USING MACHINE LEARNING

(71) Applicant: Adobe Inc., San Jose, CA (US)

(72) Inventors: Milan Aggarwal, Delhi (IN); Balaji Krishnamurthy, Noida (IN)

(73) Assignee: Adobe Inc., San Jose, CA (US)

( * ) Notice: Subject to any disclaimer, the term of this patent is extended or adjusted under 35 U.S.C. 154(b) by 277 days.

(21) Appl. No.: 16/394,853

(22) Filed: Apr. 25, 2019

(65) Prior Publication Data
US 2020/0341976 A1    Oct. 29, 2020

(51) Int. Cl.
| G06F 16/332 | (2019.01) |
| G06F 16/242 | (2019.01) |
| G06N 20/00 | (2019.01) |
| H04L 51/02 | (2022.01) |
| G06F 40/205 | (2020.01) |

(52) U.S. Cl.
CPC ...... *G06F 16/2423* (2019.01); *G06F 16/3329* (2019.01); *G06N 20/00* (2019.01); *H04L 51/02* (2013.01); *G06F 40/205* (2020.01)

(58) Field of Classification Search
CPC ...... G06F 16/3329; G06F 40/35; G06N 20/00
See application file for complete search history.

(56) References Cited

U.S. PATENT DOCUMENTS

| 2017/0308535 | A1* | 10/2017 | Agarwal | G06F 16/24578 |
| 2017/0337478 | A1* | 11/2017 | Sarikaya | G10L 15/22 |
| 2018/0218080 | A1* | 8/2018 | Krishnamurthy | G06N 3/006 |
| 2019/0126472 | A1* | 5/2019 | Tunyasuvunakool | G06N 3/0454 |

OTHER PUBLICATIONS

Cuayahuitl et al., "Spatially-Aware Dialogue Control Using Hierarchical Reinforcement Learning," May 2011, ACM Transactions on Speech and Language Processing, vol. 7, pp. 5:1-5:26. (Year: 2011).*
Wei et al., "Collaborative Filtering and Deep Learning Based Recommendation System For Cold Start Items", 2016, Elsevier, Accepted Manuscript, 32 pages.
(Continued)

*Primary Examiner* — Grace Park
(74) *Attorney, Agent, or Firm* — Finch & Maloney PLLC

(57) ABSTRACT

Techniques are disclosed for providing an interactive search session. The interactive search session is implemented using an artificial intelligence model. For example, when the artificial intelligence model receives a search query from a user, the model selects an action from a plurality of actions based on the search query. The selected action queries the user for more contextual cues about the search query (e.g., may enquire about use of the search results, may request to refine the search query, or otherwise engage the user in conversation to better understand the intent of the search). The interactive search session may be in the form, for example, of a chat session between the user and the system, and the chat session may be displayed along with the search results (e.g., in a separate section of display). The interactive search session may enable the system to better understand the user's search needs, and accordingly may help provide more focused search results.

20 Claims, 10 Drawing Sheets

(56) References Cited

OTHER PUBLICATIONS

Sutton et al., "Reinforcement Learning: An Introduction", A Bradford Book, The MIT Press Cambridge, 2014, 2015, 352 pages.
Peng et al., "Composite task-completion dialogue policy learning via hierarchical deep reinforcement learning", In Proceedings of the 2017 Conference on Empirical Methods in Natural Language Processing, 2017, pp. 2231-2240.
Mnih et al., "Asynchronous methods for deep reinforcement learning", arXiv preprint arXiv:1602.017832, Jun. 16, 2016, 19 pages.
Cuayahuitl, Heriberto, "SimpleDS: A simple deep reinforcement learning dialogue system", arXiv preprint arXiv:1601.04574, Jan. 18, 2016, 6 pages.
Zhao et al., "Towards end-to-end learning for dialog state tracking and management using deep reinforcement earning", Proceedings of the SIGDIAL 2016 Conference, 2016, 10 pages.
Ultes et al., "Domain-independent user satisfaction reward estimation for dialogue policy learning", Proc. Interspeech 2017, 2017, 5 pages.
Cuayahuitl et al., "Spatially-aware dialogue control using hierarchical reinforcement learning", ACM Transactions an Speech and Language Processing, May 2011, vol. 7, 26 pages.
Li et al., "A persona-based neural conversation model", arXiv preprint arXiv:1603.06155, Jun. 8, 2016, 10 pages.
Vinyals et al., "A neural conversational model", arXiv preprint arXiv:1506.05869, Jul. 22, 2015, 8 pages.
Weston et al., "Memory networks", arXiv preprint arXiv:1410.3916, Nov. 29, 2015, 15 pages.
Zhu et al., "Target-driven visual navigation in indoor scenes using deep reinforcement learning", arXiv preprint arXiv:1609.05143, Sep. 16, 2016, 8 pages.
Bachman et al., "Towards information-seeking agents", arXiv preprint arXiv:1612.02605, Dec. 8, 2016, 11 pages.
Nogueira et al., "Task-oriented query reformulation with reinforcement learning", Proceedings of the 2017 Conference on Empirical Methods in Natural Language Processing, 2017, pp. 574-583.
Narasimhan et al., "Improving information extraction by acquiring external evidence with reinforcement learning", arXiv preprint arXiv:1603.07954, Sep. 27, 2016, 12 pages.
Walker et al., "Paradise: A framework for evaluating spoken dialogue agents", In Proceedings of the eighth conference on European chapter of the Association for Computational Linguistics, 1997, pp. 271-280.
Deci et al., "A meta-analytic review of experiments examining the effects of extrinsic rewards on intrinsic motivation", Psychological Bulletin, 1999, vol. 125, pp. 627-668.
Hochreiter et al., "Long short-term memory", Neural computation, 1997, vol. 9, pp. 1735-1780.
Kingma et al., "A method for stochastic optimization", arXiv preprint arXiv:1412.6980, Jan. 30, 2017, 15 pages.
Randell et al., "Commerce bot scenario", retreived from the internet https://docs.microsoft.com/en-us/azure/bot-service/bot-service-scenario-commerce [retrieved Apr. 11, 2019], 4 pages.
Su et al., "Continuously learning neural dialogue management", arXiv preprint arXiv:1606.02689, Jun. 8, 2016, 6 pages.
Chandramohan et al.,"User simulation in dialogue systems using inverse reinforcement learning", In Interspeech 2011, 2011, pp. 1025-1028.
"Asynchronous Advantage Actor Critic (A3C)", retrieved from the Internet: https://github.com/Achronus/Machine-Leaming-101/wiki/Asynchronous-Advantage-Actor-Critic-(A3C), [copy retrieved Apr. 24, 2019], 5 pages.

* cited by examiner

INTERACTIVE SEARCH EXPERIENCE USING MACHINE LEARNING

FIELD OF THE DISCLOSURE

This disclosure relates to techniques for providing an interactive search experience. In particular, this disclosure relates to utilizing machine learning to provide an interactive search experience.

BACKGROUND

Information retrieval systems, or "search engines" in the context of the Internet and World Wide Web, use a wide variety of techniques to improve the quality and usefulness of the search results provided to a querying user. Such information retrieval systems have evolved over the years, and now can generate better and faster search results. The development of information retrieval systems has predominantly focused on improving the overall quality of the search results presented to the user. The quality of the results has typically been measured in terms of precision, recall, or other quantifiable measures of performance based on the static search query provided by the user. In some instances, a more advanced search engine will provide a binary choice to the user with respect to whether or not a user-provided search term must actually be included in the query, and will update the search results accordingly based on the user's choice. However, existing search interfaces do not interact with a user, to better and more deeply understand the need of the user, so that the initially provided search query can be tuned or otherwise refined to improve the quality and of the search results provided to the user, and to more generally enhance the user's search experience.

DETAILED DESCRIPTION

Figure 1:
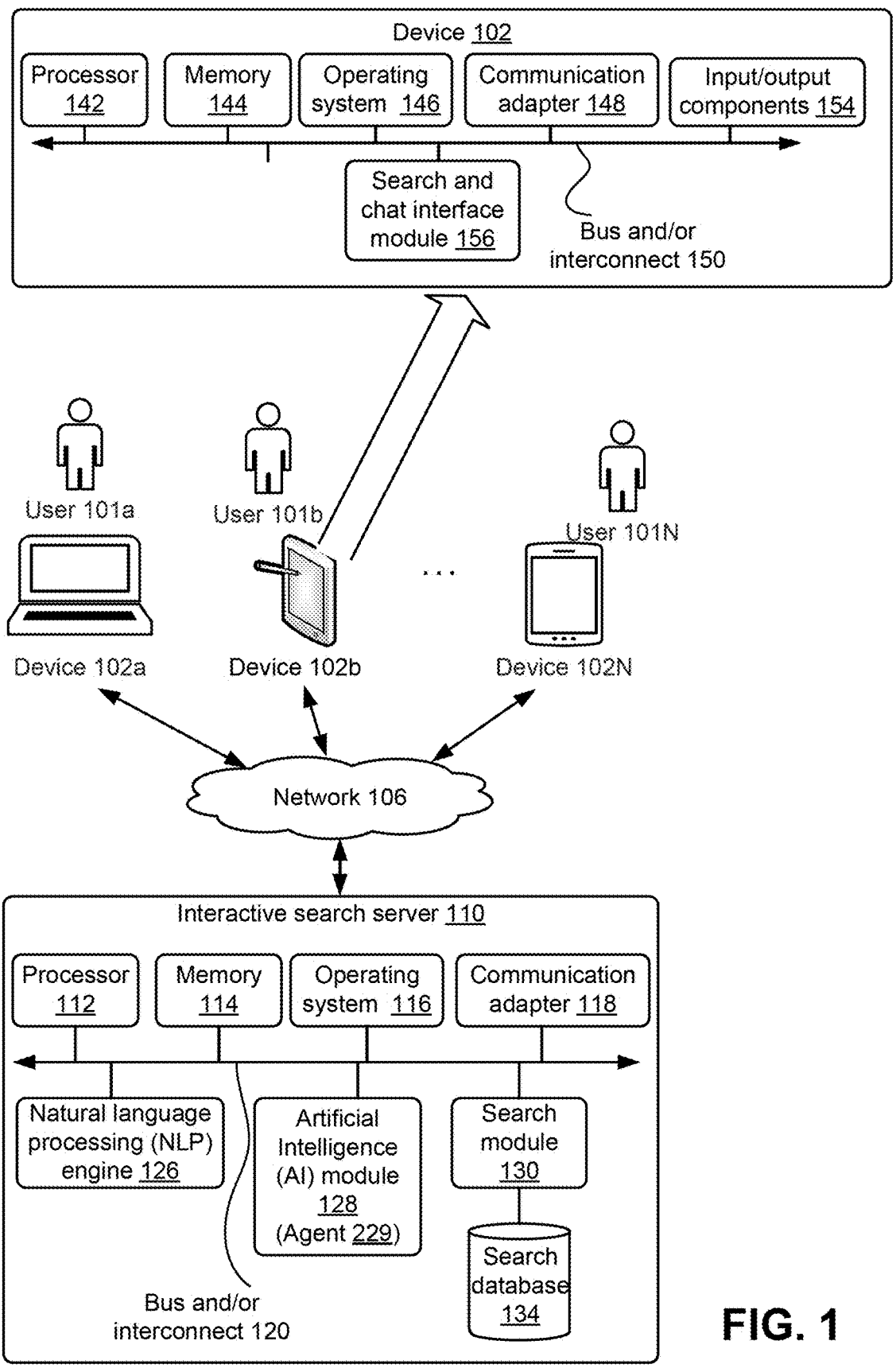
FIG. 1 is a block diagram schematically illustrating selected components of an example networked computer system configured to provide an interactive search experience, in accordance with some embodiments.

Modern day Internet provides access to a multitude of resources such as, for example, videos, images, audios, texts, Web sites, Web pages, and storage facilities, to name a few. The resources may include content for particular areas of interest, subjects, books, news articles, technical papers, instruction manuals and videos, and countless other types of content. A typical search system receives a search query, and in response, selects one or more resources from a search database, and outputs the selected search results to the user. To initiate the search, a user submits a search query to the search system, typically via a browser-based search interface accessible by the user's computing device, based on the informational need of the user. The search query is in the form of text, e.g., one or more query terms or a question. The search system traverses through the search database, selects and scores resources based on their relevance to the search query, and provides the search results. The search results usually link to the selected resources. The search results can be ordered according to the scores and presented according to this order. Unfortunately, existing search interfaces do not allow for the search system to have a meaningful interaction with the user, and therefore such search systems are unable to obtain useful contextual cues, which are often missed or not provided in the initial search query provided by the user.

Thus, and in accordance with an embodiment of the present disclosure, a search agent (also referred to as an "agent") assists the user in the search process. In this manner, the agent allows the search process to be interactive, thereby allowing the system to gather contextual clues that can then be used to enhance the initial search query provided by the user. The agent, which is implemented using a machine learning algorithm as will be explained in turn, interacts with the user to, for example, refine the search query, probe issues related to the search query, encourage the user to select or click on search results, and/or otherwise engage the user to provide a more interactive and focused search experience. Thus, instead of the search engine merely retrieving the result set based on a static search query, the agent interacts with the user to collect more contextual cues about the search and improves the initial search query and the results of that search. For example, if a user searches for a birthday gift, a search engine according to an embodiment follows-up by asking for contextual queues, which in this example case might include, for instance, enquiring about the intended recipient of the gift, a range of interest of the recipient, the age and gender of the recipient, and other such pertinent factors. Such information and interaction can provide a more engaging search experience, along with assisting the user find more relevant search results.

In an embodiment, the agent that facilitates an interactive search experience is implemented using an appropriate machine learning algorithm, such as reinforcement learning (RL) or a comparable technique. Reinforcement learning is type of machine learning that deals with how a software agent should take actions in a given environment so as to maximize some notion of cumulative reward. Reinforcement learning is distinct from other types of machine learning, such as supervised learning and unsupervised learning. For example, and according to one such embodiment, an RL-based agent interacts with a user, to help the user to narrow down and refine relevant search results by providing the user with contextual assistance. This interaction takes place over multiple interaction cycles with the user, where in a given cycle the RL-based agent prompts, and the user responds (or the user provides an input, and the RL-based agent responds). So, in operation, at each interaction cycle with the user, the RL-based agent decides on what action to undertake based on what it knows so far. This decision is policy-based. In particular, the decision is based on a number of possible actions that can be taken by the agent, wherein at a given point in time during the conversation, each action is associated with a probability or rank with respect to its relevance. These actions and probabilities can be represented in an agent action policy.

In more detail, and in example, for a given interactive cycle, a corresponding agent action policy dictates what action the RL-based agent is to undertake based on, for instance, past agent actions, past user actions, length of conversation so far, and discretized relevance scores of search results, according to an embodiment. This information acquired by the RL-based agent is generally referred to herein as the state of the interactive search. So, at any given point in time during a conversational search session between an agent and a user, the interactive search has a known state, and the state can change or otherwise evolve in response to each cycle of the conversation. Thus, the agent action policy changes and evolves with each interactive cycle, based on the state of the interactive search. In this manner, the search results are updated based on what the RL-based agent has learned from its interactions with the user. In one such example embodiment, an asynchronous advantage actor-critic (A3C) RL-based architecture is utilized to explicitly model and approximate the RL-based agent's action policy, as a function of the state of the interactive search, as will be explained in turn. In one such embodiment, the A3C algorithm generates an actor output and a critic output. The actor output includes the possible actions the RL-based agent can take, and the critic output includes the state of the search session. As previously noted, the state encodes the agent actions and user actions in the last k cycles of the search session.

As will be appreciated, the techniques provided herein can be implemented in, for example, software (machine-readable mediums), machines or systems, and search services, and numerous embodiments and configurations will be apparent. Note that in the case of search services, the search may be carried out, for example, using the Internet according to some embodiments, while in other such embodiments may be carried out in a search-in-a-box application. One example embodiment is a method for interactive search carried out at a server. In one such example case, the method includes receiving, at the search engine, a search query from a user device. The search engine is configured with an RL-based agent programmed to interact with the user, to help the user in refining the search query by providing the user with contextual assistance. The method further includes generating, by the RL-based agent and based at least in part on the search query, a vector representation of a plurality of values corresponding to a plurality of possible actions that the search engine can take in response to the search query. Each of the possible actions is associated with a corresponding one of the values, and each value indicates a rank of that action relative to the other possible actions. In particular, a given value encodes a sequential aggregation of one or both agent and user actions in last k cycles of the search session to capture both a local context (the current and/or just previous cycle of interaction between the user and the agent) and a global context (additional previous or otherwise relatively older historical cycles of interaction between the user and the agent, not included in the local context). The method continues with selecting, by the RL-based agent, an action from the possible actions, based at least in part on the value corresponding to the selected action. Once the appropriate action is selected by the RL-based agent, the search engine transmits a message to the user device. The message is based at least in part on the selected action. Further note that the message is different from results of the search query, and solicits further action from the user. The search query can then be refined based at least in part on further action by the user that is responsive to the message. Numerous variations and other embodiments will be appreciated in light of this disclosure, including corresponding methods on the client-side. To this end, the techniques provided herein can be applied in a client-server framework, and may involve server-side functionality, client-side functionality, or both.

In an example use case, the agent is trained for providing assistance in subjective search tasks, which is in contrast to dialogue agents designed for specific objective tasks like restaurant, flight or hotel reservations (e.g., which have limited and well-defined objective search modalities, without much scope for subjective discussion). For instance, when searching for a restaurant, a user can pre-specify his or her preferences (e.g., budget, distance, cuisines, etc.), which allows the problem to be more simply modeled as a slot filling exercise for a standard search assistant (e.g., a search assistant designed specifically for restaurant search knows to provide options regarding dining budget and cuisine). As will be appreciated, the context of such a simple slot filling exercise is presumed or already predefined and known in advance of the search. In contrast, an agent as variously discussed in the present disclosure provides assistance in subjective search tasks, wherein the nature of the search problem at hand is fundamentally different from such slot filling exercises. In particular, in subjective search, simple search modalities and slots cannot be defined in advance and need to be discovered. To this end, an agent as variously described herein engages the user directly into the search which comprises a sequence of alternate turns between user and agent with more degrees of freedom (in terms of different actions the agent can take). For example, assume a scenario where a designer is searching for digital assets (e.g., over a repository of images, or videos) to be used in a movie poster. The user would start with a broad idea or concept, and her initial search criteria would be refined as the interactive search progresses. The modified search criteria involve an implicit cognitive feedback (such as conversationally acquired context), which can be used to improve the search results. The agent is trained for this type of subjective search task.

Training of the neural network based agent can be carried out in a number of ways. In an example embodiment using A3C RL-based architecture, a stochastic virtual user environment is used to simulate human behavior (i.e., a virtual user). As will be appreciated, this virtual user can be used to bootstrap or jumpstart the training of the A3C algorithm of the RL-based agent (e.g., in absence of substantial or sufficient real-life data on user interaction with the agent). In particular, interaction of the virtual user with the RL-based agent is used in training episodes in order to bootstrap the learning of the agent. In an example, the agent is trained using A3C RL, where the agent interacts with one or more virtual users in one or more training episodes. A single training episode comprises a sequence of alternate interactions between the virtual user and the agent. The extent to which the agent helps the user depends on the sequence of interaction, and the type of actions the agent undertakes based on the user behavior. The state of the agent is modeled based on the interactions, and A3C architecture enables the agent to capture search context at a local and global search level. For example, relying on states that encode a history of agent actions and user actions in last k turns of the search (e.g., where k is an integer) captures a local context of the search. However, the conversation between the user and the agent may be longer than the last k turns of the search, and local context may not be sufficient to capture user behavior during the entire search episode. The long short-term memory (LSTM) in the architecture aggregates the local context, as it sequentially processes the states, thereby providing the A3C architecture a global context of the search episode, which results in capturing context at a global search level.

As will be appreciated, under the RL framework of rewards, intermediate reward is given to the agent at each step of conversation, e.g., based on the agent's actions and current state of the conversational (interactive) search. This type of reward is generally referred to herein as an extrinsic reward. The agent learns the applicability of different action policies through these extrinsic rewards.

In addition to such extrinsic rewards, rewards may be awarded to the agent based on performance of the agent on one or more auxiliary tasks. For example, auxiliary tasks may be tasks that the search provider intends that the user completes, such as the user signing up (or signing in) with the search provider, the user using a discount or coupon provided by the search provider, the user downloading, adding to cart, and/or purchasing or assets found during the search, to name a few example auxiliary tasks. Thus, the agent prompts the user to complete one or more auxiliary tasks, during interaction or conversation of the agent with the user. Rewards awarded to the agent, based on the user performing one or more auxiliary tasks, is generally referred to herein as an auxiliary reward.

System Architecture

FIG. 1 is a block diagram schematically illustrating selected components of an example networked computer system 100 configured to provide an interactive search experience, in accordance with some embodiments. As can be seen, the system 100 includes an interactive search server 110 accessible via a network 106, and is capable of providing an interactive search experience to users 101 of computing devices 102. Users 101a, 101b, . . . , 101N can use their respective computing devices 102a, 102b, . . . , 102N to engage server 110 for a conversational search experience.

As will be appreciated, the configuration of the computing devices 102 and server 110 may vary from one embodiment to the next. To this end, the discussion herein will focus more on aspects of devices 102 and server 110 that are related to facilitating conversational search, and less so on standard componentry and functionality typical of computing and server systems. Moreover, note that the location of some functional modules may vary from one embodiment to the next. For instance, while module 126 is shown on the server side in this example case, it may be on the client side in other embodiments. Any number of client-server configurations will be apparent in light of this disclosure. In still other embodiments, the techniques may be implemented entirely on a user computer, in a search-in-a-box configuration or simply as stand-alone conversational search application. In any such applications, further note that the database to be searched can be local or remote to the system, so long as it is accessible for search.

Individual ones of the computing devices (also referred to as devices) 102a, 102b, . . . , 102N may comprise, for example, desktop computers, laptop computers, workstations, enterprise class server computers, handheld computers, tablet computers, smartphones, set-top boxes, game controllers, and/or any other computing devices that can access the server 110 over the network 106 and can implement search functionality. Merely as examples, device 102a is illustrated to be a laptop, device 102b is illustrated to be a tablet, and device 102N is illustrated to be a smartphone. Elements referred to herein with a common reference label followed by a particular letter may be collectively referred to by the reference label alone. For example, devices 102a, 102b, . . . , 102N may be collectively and generally referred to as devices 102 in plural, or device 102 in singular. The number N of the devices 102 can be any integer. Example users 101a, 101b, . . . , 101N of the devices 102a, 102b, . . . , 102N, respectively, are illustrated in FIG. 1, although individual devices 102 may have more than one user.

FIG. 1 illustrates an example implementation of an individual device 102b. Other devices 102a, 102c, . . . , 102N may have at least in part similar components. In the illustrated embodiment, the device 102 includes one or more software modules configured to implement certain of the functionalities disclosed herein, as well as hardware configured to enable such implementation. These hardware and software components may include, among other things, a processor 142, memory 144, an operating system 146, a communication adaptor 148, input/output components 154, and a search and chat interface module 156. A bus and/or interconnect 150 is also provided to allow for inter- and intra-device communications using, for example, communication adaptor 148 and/or network 106. Note that components like the operating system 146 and search and chat interface module 156 can be software modules that are stored in memory 144 and executable by the processor 142. To this end, the bus and/or interconnect 150 is symbolic of all standard and proprietary technologies that allow interaction of the various functional modules shown, whether that interaction actually takes place over a physical bus structure or via software calls, request/response constructs, or any other such inter and intra component interface technologies.

Processor 142 can be implemented using any suitable processor, and may include one or more coprocessors or controllers, such as an audio processor or a graphics processing unit, to assist in processing operations of the device 102. Likewise, memory 144 can be implemented using any suitable type of digital storage, such as one or more of a disk drive, solid state drive, a universal serial bus (USB) drive, flash memory, random access memory (RAM), or any suitable combination of the foregoing. Operating system 146 may comprise any suitable operating system, such as Google Android, Microsoft Windows, or Apple OS X. As will be appreciated in light of this disclosure, the techniques provided herein can be implemented without regard to the particular operating system provided in conjunction with device 102, and therefore may also be implemented using any suitable existing or subsequently-developed platform. Communication adaptor 148 can be implemented using any appropriate network chip or chipset which allows for wired or wireless connection to network 106 and/or other computing devices and/or resources. To this end, the device 102 is coupled to the network 106 via adaptor 148 to allow for communications with other computing devices and resources, such as the server 110. The device 102 also includes one or more input/output components 154, such as one or more of a tactile keyboard, a display, a touch sensitive display, a microphone, a camera, scanner, and location services. In general, other componentry and functionality not reflected in the schematic block diagram of FIG. 1 will be readily apparent in light of this disclosure, and it will be appreciated that the present disclosure is not intended to be limited to any specific hardware configuration. Thus, other configurations and subcomponents can be used in other embodiments.

Still referring to the example embodiment illustrated in FIG. 1, the device 102 includes software modules including the search and chat interface module 156 (also referred to as module 156). In an example, the module 156 generates one or more User Interface (UI) (also referred to as chat and search UI) through which the user 101 can enter a search query to server 110, chat with an agent implemented in the server 110, or otherwise interact with server 110. In one such example embodiment, the UI generated by the module 156 comprises a two-pane window: one for text dialogues between the user 101 and the agent of the server 110, and another for displaying search results. Further details of search and chat interface module 156 and the UI will be discussed in turn.

In one embodiment, the server 110 comprises one or more enterprise class devices configured to provide a range of services that may be invoked to provide interactive search services, as variously described herein. Examples of such services include providing search services to the devices 102, interacting with the devices 102 while providing the search services (e.g., to refine the search), and providing search and chat interface 156 on the devices 102 (through which the server 110 interacts with the users 101), as will be explained in turn. Although one interactive search server 110 is illustrated in FIG. 1, it will be appreciated that, in general, tens, hundreds, thousands, or more such servers can be used to manage an even larger number of interactive searches.

In the illustrated embodiment, the server 110 includes one or more software modules configured to implement certain of the functionalities disclosed herein, as well as hardware configured to enable such implementation. These hardware and software components may include, among other things, a processor 112, memory 114, an operating system 116, a natural language processing (NLP) engine 126, an Artificial Intelligence (AI) module 128, a search module 130, and a communication adaptor 118. A bus and/or interconnect 120 is also provided to allow for inter- and intra-device communications using, for example, communication adaptor 118 and/or network 106. Note that components like the operating system 116, NLP engine 126, AI module 128, and search module 130 can be software modules that are stored in memory 114 and executable by the processor 112. The previous relevant discussion with respect to the symbolic nature of bus and/or interconnect 150 is equally applicable here to bus and/or interconnect 120, as will be appreciated.

Processor 112 can be implemented using any suitable processor, and may include one or more coprocessors or controllers, such as an audio processor or a graphics processing unit, to assist in processing operations of the server 110. Likewise, memory 114 can be implemented using any suitable type of digital storage, such as one or more of a disk drive, a universal serial bus (USB) drive, flash memory, random access memory (RAM), or any suitable combination of the foregoing. Operating system 116 may comprise any suitable operating system, and the particular operation system used is not particularly relevant, as previously noted. Communication adaptor 118 can be implemented using any appropriate network chip or chipset which allows for wired or wireless connection to network 106 and/or other computing devices and/or resources.

The server 110 is coupled to the network 106 to allow for communications with other computing devices and resources, such as the devices 102. Network 106 may be a local area network (such as a home-based or office network), a wide area network (such as the Internet), or a combination of such networks, whether public, private, or both. In some cases, access to resources on a given network or computing system may require credentials such as usernames, passwords, or any other suitable security mechanism. In general, other componentry and functionality not reflected in the schematic block diagram of FIG. 1 will be readily apparent in light of this disclosure, and it will be further appreciated that the present disclosure is not intended to be limited to any specific hardware configuration. In short, any suitable hardware configurations can be used.

Still referring to the example embodiment illustrated in FIG. 1, the search module 130 is capable of searching the search database 134, in response to an information retrieval request (also referred to as a search query, a search request, or the like) from the device 102. Note that the search database 134 may be retained locally within the server 110, or distributed in one or more remote or otherwise networked storage repositories, or in a combination of such local and remote storage resources. Each of the search module 130 and search database 134 can be implemented with standard or proprietary technology, in addition to the functionality as variously provided herein for carrying out a conversational search process.

The AI module 128 facilitates interaction between the devices 102 and the server 110, and is used to implement a search agent 229. The NLP engine 126 parses search query and messages from the user into a format that is understandable to the search module 130 and the AI module 128. The NLP engine 126 also parses search results and messages from the search module 130 and the AI module 128 into a format that is understandable by the user 101. Additional details regarding the functionality provided by each of the search module 130, the AI module 128, and the NLP module 126 will be provided in turn.

As will be appreciated in light of this disclosure, the various modules and components of the system, such as the search and chat interface module 156, the search module 130, the AI module 128, and the NLP module 126 modules, can be implemented in software, such as a set of instructions (e.g. C, C++, object-oriented C, JavaScript, BASIC, or other instruction set) encoded on any computer readable medium (e.g., hard drive, server, or other suitable non-transitory memory), that when executed by one or more processors, cause the various methodologies provided herein to be carried out. In other embodiments, such components/modules may be implemented with hardware, such as gate level logic (e.g., FPGA) or a purpose-built semiconductor (e.g., ASIC). Still other embodiments may be implemented with a microcontroller having a number of input/output ports for receiving and outputting data, and a number embedded routines for carrying out the functionality described herein. Any suitable combination of hardware, software, and firmware can be used.

Example Operation and Results

Figure 2:
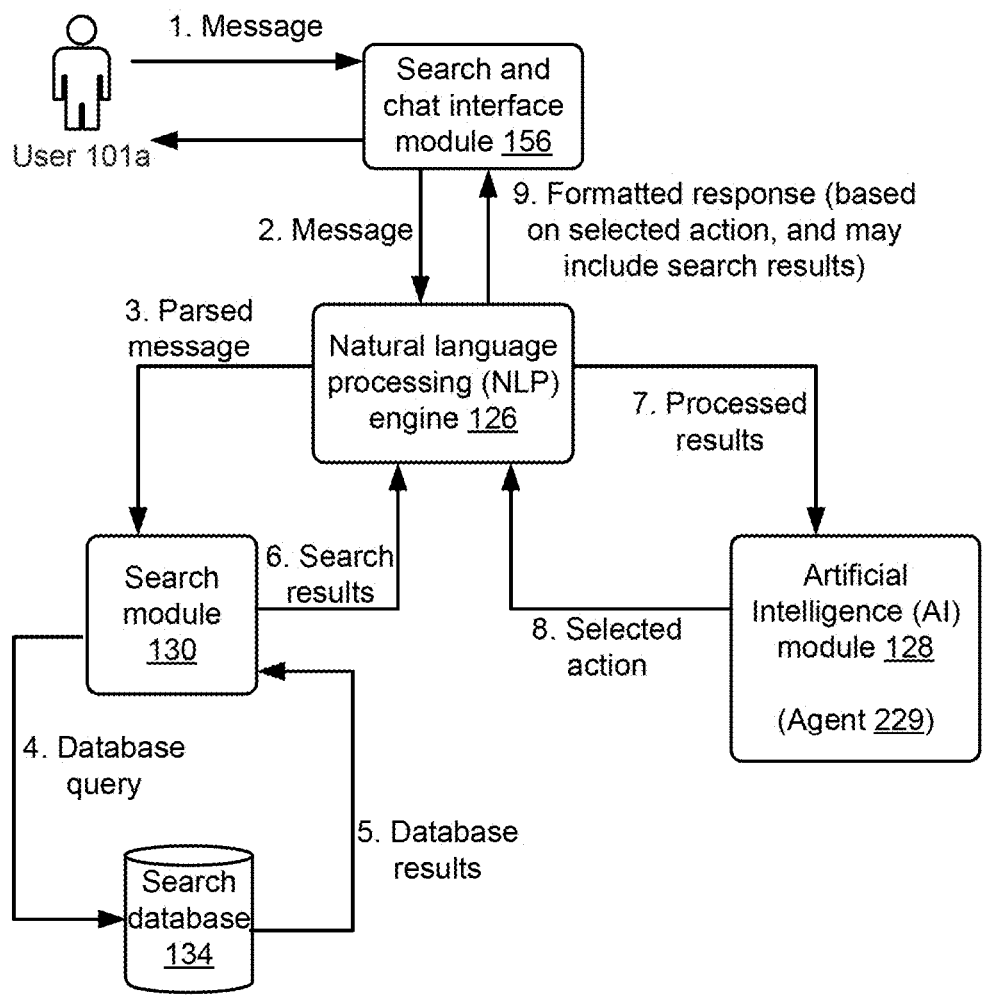
FIG. 2 illustrates example interactions between various modules of the system of FIG. 1 during a single interaction turn or cycle between an agent and a user, in accordance with some embodiments.
Figure 3A:
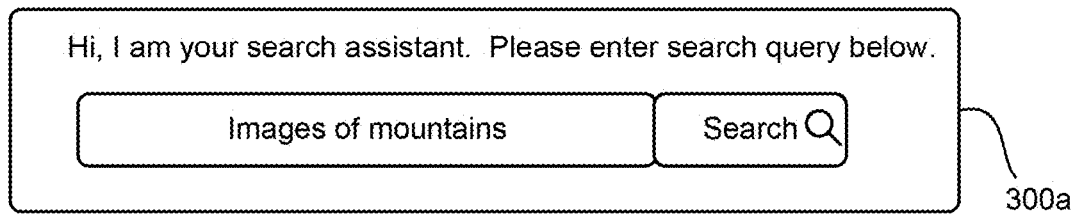
FIG. 3A illustrates an example search User Interface (UI) provisioned by the search and chat UI module of FIG. 1, and FIGS. 3B, 3C illustrate example interactions between an agent and a user via that UI, in accordance with some embodiments.
Figure 3B:
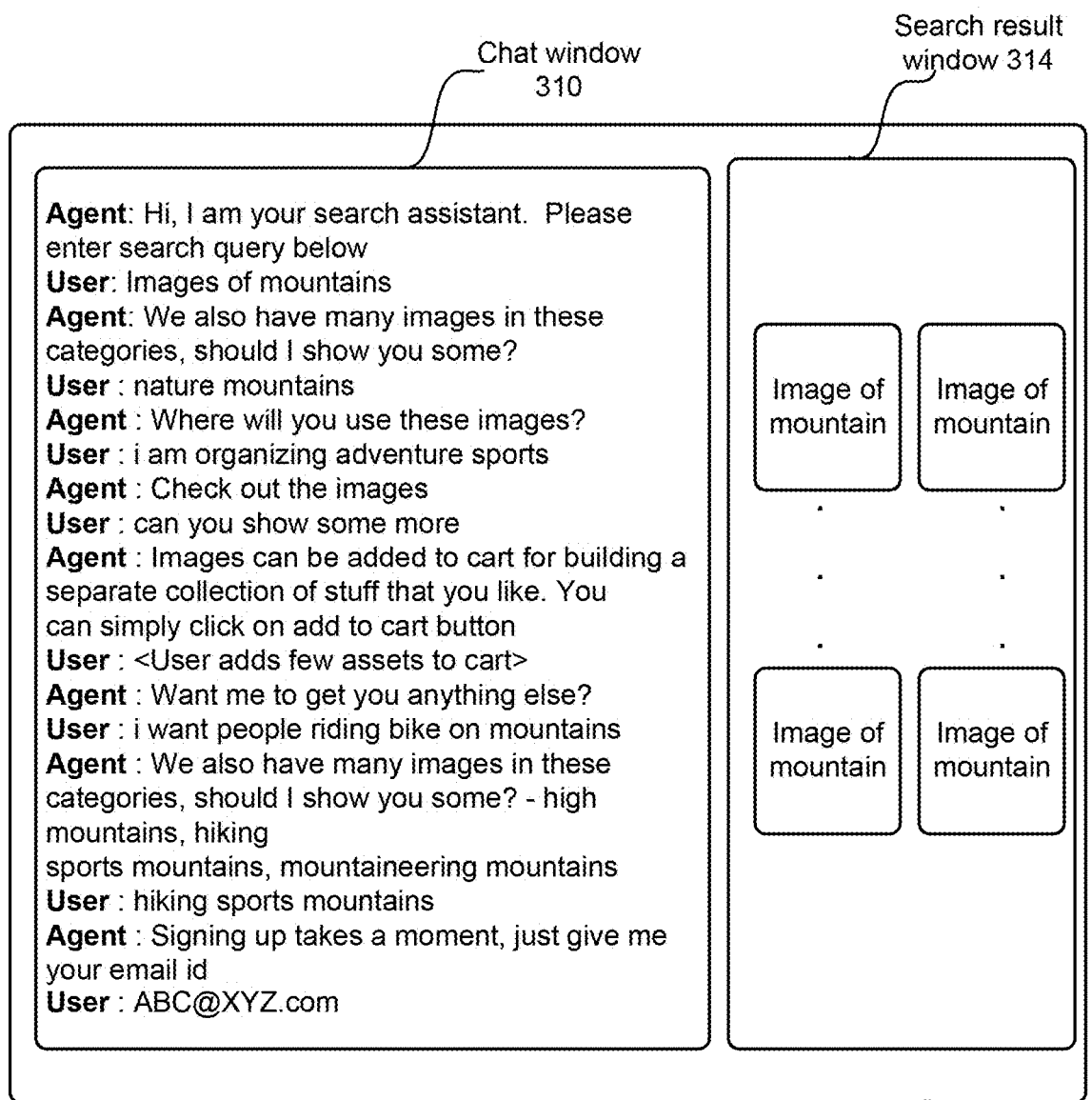

Example operation and results will be discussed in the context of FIGS. 2, 3A, 3B, and 3C. FIG. 2 illustrates example interactions between various modules of the system 100 of FIG. 1 during a single interaction cycle (also referred to as conversation turn or search turn) between an agent and a user, in accordance with some embodiments. FIG. 3A illustrates an example search User Interface (UI) 300a (also referred to as UI 300a) displayed on a display of the device 102, FIG. 3B illustrates an example interaction between the agent 229 and the user 101 via a search and chat UI 300b (also referred to as UI 300b) displayed on a display of the device 102, in accordance with some embodiments. In an example, display of the UIs 300a and 300b is caused by the search and chat interface module 156 executing on the device 102. In another example, display of the UIs 300a and 300b is caused by the server 110, which transmits messages, search results, and/or other relevant information to the device 102, to cause the device 102 to display such information via the UIs 300a, 300b.

Figure 3C:
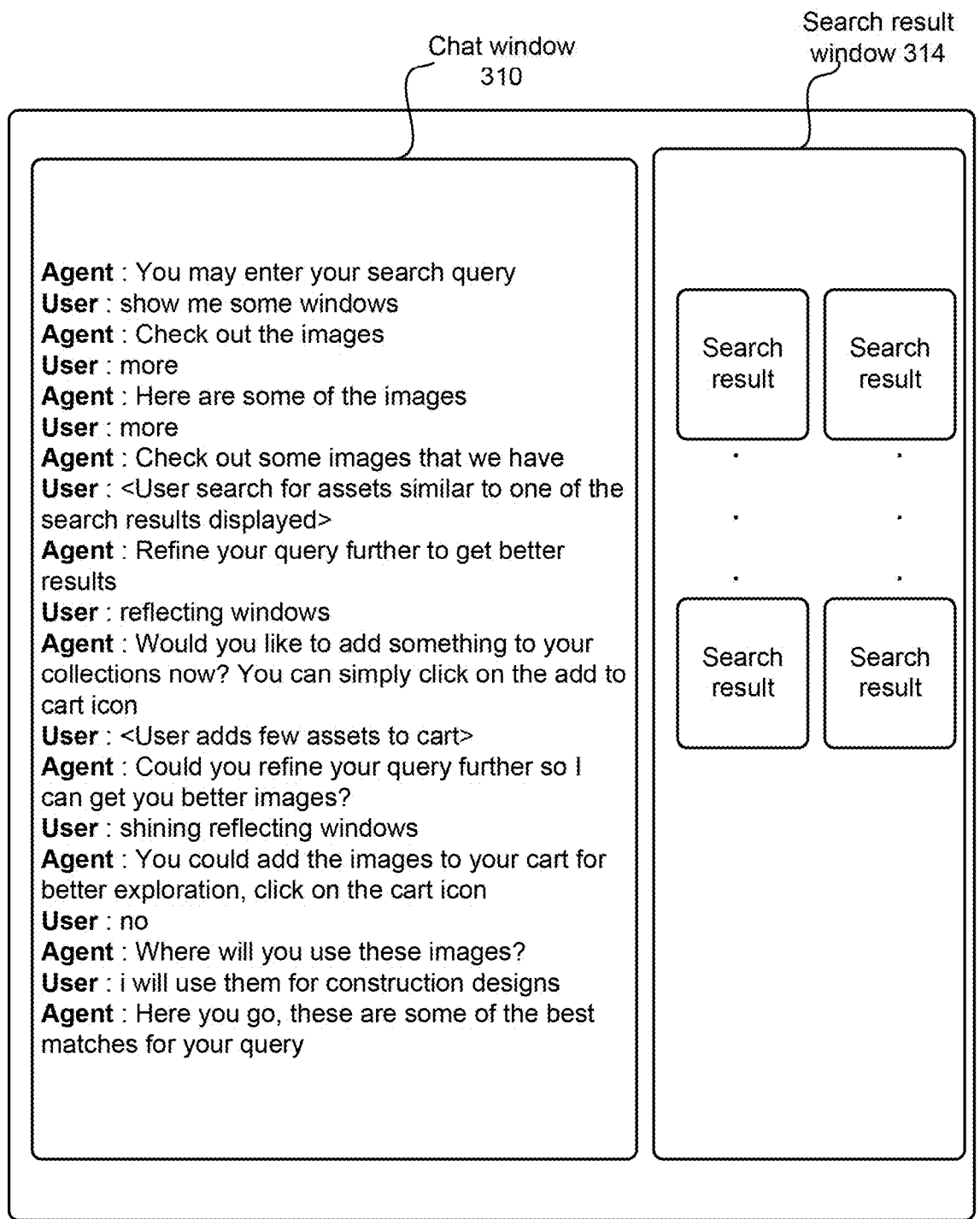

FIG. 3C illustrates another example interaction between the agent 229 and the user 101 via the search and chat UI 300b, in accordance with some embodiments.

Referring to FIGS. 2, 3A, and 3B, the user 101 of a device 102 can engage the interactive search service by, for example, submitting a URL request via a browser. The request is received by the server 110. In response to the request, the server 110 serves a webpage to the requesting device 102, the webpage including any of the UIs 300a, 300b displayed by the search and chat interface module 156. The module 156 may be, for instance, JavaScript or other suitable code, as will be appreciated. In still other embodiments, the user 101 of device 102 can engage the interactive search service by, for example, activating a local interactive search application stored on device 102. In such cases, the local interactive search application includes the search and chat interface module 156. In any such cases, the module 156 causes display of the UI 300a (or the UI 300b) on a display of the device 102. The UI 300a or the UI 300b allows the user 101 to enter an initial search query. In the example of FIGS. 3A, 3B, the search query entered by the user 101 is related to "images of mountains." As illustrated in FIG. 3B, the agent 229 interacts with the user 101 via the UI 300b, to better understand the contextual cues associated with the search query. For example, as illustrated in FIG. 3B, the agent 229 asks the user 101 the following: "We also have many images in these categories, should I show you some?" In response and merely as an example, the user replies "nature mountains." Such interactions between the user and the agent 229 allow the server 110 to provide better and more focused search results, as will be discussed in turn.

As further illustrated in FIG. 3B, the example UI 300b comprises a chat window 310 to allow the interaction between the agent 229 and the user 101, and a search result window 314 to display the search results. The search results may be updated during the progress of the chat, as the server 110 learns more about the contextual cues associated with the search. For example, initially, when the user searches for images of mountains, the search result window 314 may display images of all sorts of mountains. But when the user 101 further clarifies that he or she prefers the category of "nature mountains," a more refined set of images pertaining to mountains (such as those having facilities to accommodate hiking) is displayed in the window 314.

The chat window 310 illustrates various interactions between the user 101 and the agent 229. A single interaction cycle between the agent 229 and the user 101 refers to a message from the user 101 and a corresponding response or action from the agent 229, or a query from the agent 229 and a reply from the user 101. For example, the agent 229 queries: "Where will you use these images?," to which the user 101 replies "I am organizing adventure sports." This is an example of a single interaction cycle. In another example, the user 101 initially says: "Images of mountains," to which the agent 229 replies "We also have many images in these categories, should I show you some?" This is another example of a single interaction cycle. FIG. 2 illustrates example interactions between various modules of the system 100 of FIG. 1 during such a single interaction cycle between the agent 229 and the user 101, and will be further discussed in turn.

A search episode refers to the full or entirety of conversation between the user 101 and the agent 229 for a specific search query. For example, the UI 300b illustrates a single search episode.

Referring to FIGS. 2 and 3B, during a single interaction cycle, the device 102 receives input from the user 101. This is illustrated in FIG. 2 as "1. message" from the user 101 to the search and chat interface module 156 (e.g., via the UI 300a). The module 156 then transmits the message to the NLP engine 126 (illustrated in FIG. 2 as "2. message" from module 156 to the NLP engine 126). In an example, the message may include any information provided by the user to the agent. Thus, for example, referring to the example UI 300b of FIG. 3B, any information input by the user 101 (e.g., during a conversation between the user 101 and the agent) may be a message, such as an initial search query, a refinement of the search query based on a query or action by the agent 229, or any response or action from the user 101.

The NLP engine 126 parses the message, such as the search query, into a format that is understandable to the search module 130. For example, FIG. 2 illustrates the NLP transmitting parsed message to the search module 130. The NLP engine 126 is a rule based unit, which utilizes dependencies between words and their part-of-speech (POS) tags in a sentence to obtain query and user action. The query (e.g., "images of mountains" of FIG. 3A) is formulated sequentially by locating the primary keyword and then determining the surrounding keywords. A distinction between a new query and refined query (where a refined query is based on a refinement of a previous search query, such as "nature mountains" of UI 300b) is made depending on whether the current primary keyword is present in one or more previous queries. A database is used to store the user queries to incorporate context of conversation while formulating the search query to be sent to the search module 130. In an example embodiment, rules and stop words are used for determining different user actions. For example, words like "yes", "no" are used for providing feedback signals when the agent of the server 110 asks different probing questions, words like "more" means that the user is requesting more results for the same query, "cluster category click" is determined based on whether the user clicks on one of the categorical options provided by the agent, "search similar" is determined on the basis of whether the user drags the URL of one of the search results into the text area, and so on, as will be discussed in further detail herein.

The search module 130 transmits a database query to the search database 134 using the parsed message, and the search database 134 generates a database result in response. The search module 130, thus, seeks assets from the search database 134 corresponding to the search query formulated by NLP engine 126. The database 134 comprises thousands, and likely millions or billions of assets of different types, such as images, videos, web pages, or other searchable content. Assets are indexed in the database 134 using tags and other metadata for retrieval during the search. Merely as an example, assets are indexed using Apache Solr™, a text-based search platform. The search module 130 also fetches and clusters assets having tags similar to the most relevant assets retrieved, e.g., to formulate related categorical asset options. Relevance scores of retrieved assets are calculated on the basis of the degree of match between asset metadata and the search query. These scores are dispatched with fetched assets and categorical options to the NLP engine 126.

The NLP engine 126 may optionally process and/or parse the output of the search module 134, and transmit the parsed results to the AI module 128. Once the AI module 128 receives the processed results from the NLP engine 126 (or receives the search results directly from the search module 130), the AI module 128 selects an agent action from a plurality of agent actions, as will be further discussed herein in turn (e.g., Tables 1 and 2 further detail example agent actions). In an example, the AI module 128 is trained using Asynchronous Advantage Actor-Critic (A3C) algorithm, which uses RL. The AI module 128 transmits information associated with the agent action to the NLP engine 126, which translates it to a format that is presentable in the UI 300*b*. The NLP engine 126 then transmits a formatted response to the module 156, where the formatted response may be based on the selected action. In some cases, the formatted response may also include the requested search results. As the formatted message is transmitted from the server 110 to the device 102, the formatted message is also referred to as a system message, or a system generated message (e.g., as opposed to a user message, or user generated message, which is a message input by the user 101).

As previously discussed, FIG. 2 illustrates example operations during a single interaction cycle between the agent 229 and the user 101. This process of interaction between the user 101 and the server 110 is repeated iteratively, as illustrated in the example UI 300*b*.

Reinforcement Learning

In an example, the AI module 128 (e.g., the agent 229) is trained using A3C algorithm, which uses RL. For example, RL is used to select an action of the agent 229, in response to input received from the user 101.

Reinforcement Learning is the paradigm to train the agent 229 to operate in an environment E. The agent interacts with the environment in a series of independent episodes, and each episode comprises a sequence of turns. At each turn, an agent (e.g., implemented by the AI module 128) observes the state "s" of the environment (e.g., $s \in S$, where S is a state space, which is a set of possible states) and performs an action "a" (e.g., $a \in A$, where A is an action space, which is a set of all the possible actions by the agent). When the agent performs an action, the state of the environment changes and the agent gets a corresponding reward. An optimal (or near optimal) action policy maximizes cumulative reward that the agent gets, e.g., based on the actions taken according to the policy, from a start until a final terminal state is reached in the search episode.

Agent Action Space

Action space A, e.g., set of actions that can possibly be undertaken by the agent 229, is designed to enable the interactive search agent 229 to interact with the user 101, and help the user 101 in searching the desired assets conveniently and interactively. The agent actions, in an example, are divided into two sets: a set of probe intent actions "P", and a set of general actions "G." For example, Table 1 below lists example probe intent actions P and Table 2 below lists example general actions G.

TABLE 1

Probe Intent Actions P that may be undertaken by the agent of the server 110

| No. | Action | Description |
| --- | --- | --- |
| AP1 (Action agent probe intent - 1) | Probe use case | Interactively ask the searcher about where the search assets will be used |
| AP2 | Probe to refine | Ask the user to further refine search query, if less relevant results are retrieved |
| AP3 | Cluster categories | Ask the user to select from categorical options relative to the search query |

TABLE 2

General Actions G that may be undertaken by the agent of the server 110

| No. | Action | Description |
| --- | --- | --- |
| AG1 (Action agent general - 1) | Show results | Display on the UI 300b results corresponding to most recent user query |
| AG2 | Add to cart | Suggest user to add one or more assets found in the results of the search to a cart for buying, or bookmarking for later reference |
| AG3 | Suggest user to download | Suggest user to download results and/or content, if it suits the user's requirement |
| AG4 | Suggest user to purchase | Suggest the user to buy paid assets |
| AG5 | Offer discount and/or coupon | Offer special discounts, coupons, etc., based on user's search history |
| AG6 | Suggest user to sign up, or sign in | Request the user to sign up, or sign in, to create or log in to an account, e.g., to receive updates regarding th esearch session, save the search session, etc. |
| AG7 | Request feedback or comments | Request feedback about the search so far |

TABLE 2-continued

General Actions G that may be undertaken by the agent of the server 110

| No. | Action | Description |
|---|---|---|
| AG8 | Provide help and support | List possible ways in which the agent can assist the user |
| AG9 | Salutation | Greet the user at the beginning, say goodbye or thanks when user concludes the search |

Although Tables 1 and 2 illustrate a set of three probe intent agent actions AP1, AP2, AP3, and nine general agent actions AG1, . . . , AG9, the example agent actions of Tables 1 and 2 are not intended to be exhaustive or limiting to the scope of this disclosure. The agent actions of Tables 1 and 2 are mere examples, and the agent 229 of the server 110 may implement more or fewer agent actions, as will be appreciated. The example agent actions of Tables 1 and 2 are self explanatory and some of the agent actions will be discussed in further detail herein.

Referring to Table 1, in an example, the agent uses the probe intent actions P (e.g., any of the actions AP1, . . . , AP3) to explicitly query the user 101 to learn more about search context. For example, the user may perform a relatively open-ended query, resulting in a diverse set of results. In such scenarios, the agent may prompt the user to refine the search query (e.g., agent action AP2), and/or add details like where the search results would be used (e.g., agent action AP1). For example, as illustrated in the UI 300b, in response to the user 101 searching for images of mountains, the agent 229 interacts with the user 101 to refine the search query, probe the use of the images, etc. For example, the agent 229 enquires as to where the images will be used (e.g., agent action AP1). In an example, the agent 229 may cluster the search results into multiple categories (e.g., within the window 314) and prompt the user to choose a category from the categories. These actions carry the conversation with the user 101 further, and provide various cues about the search context, e.g., which may not be evident from the original search query provided by the user 101.

Referring to Table 2, in an example, the set of general agent actions G comprises generic actions, such as displaying assets retrieved corresponding to the user query (e.g., agent action AG1), providing help to the user 101 (e.g., agent action AG8), etc. While probe intent actions are useful to gauge user intent, general action set G comprises actions for carrying out the general functionality related to the search. The general actions G, in an example, also include actions which promote the business use cases, e.g., prompting the user to sign up with an email address (e.g., agent action AG6), download and/or purchase assets (e.g., agent actions AG2, AG3, AG4, and/or AG5), etc. The agent 229 is rewarded appropriately for such prompts, e.g., depending on the subsequent user actions. In an example, the agent 229 learns to perform different actions at appropriate time steps in search episodes.

Table 3 below illustrates a set of possible and example user actions.

TABLE 3

User actions that may be undertaken by the user 101

| No. | Action | Description |
|---|---|---|
| AU1 (Action user - 1) | New query | First query or most recent query with no intersection with previous ones |
| AU2 | Refine query | Query searched by user has some intersection with previous queries |
| AU3 | Request more | Clicking on next set of results for same query |
| AU4 | Click result | User clicking on search results being shown |
| AU5 | Add to cart | When user adds some of searched assets to her cart for later reference |
| AU6 | Cluster category click | When user clicks on filter options like orientation or size |
| AU7 | Search similar | Search assets with similar series, model etc. |
| AU8 | Click assets | Click on a downloadable, purchasable, and/or another asset |
| AU9 | More assets | Request more assets |

Although Table 3 illustrates a set of nine possible user actions AU1, . . . , AU9, the example user actions are not intended as exhaustive or limiting to the scope of this disclosure. The user actions are mere examples, and the agent of the server 110 may allow more or fewer user actions, as will be appreciated. The user actions of Table 3 are self-explanatory and some of the user actions will be discussed in further detail herein.

State Space

In an example, a state representation of the RL is modeled in order to encapsulate facets of search, as well as conversation between the user and the agent. The state "s" at every turn in the conversation is modeled using one or more of a history of user actions "history_user," history of agent actions "history_agent," discretized relevance scores of search results "score_results," and a variable "length_conv" (e.g., which represents a number of user responses in the conversation until that point between the user 101 and the agent 229), in this example embodiment.

The history of user actions "history_user" and the history of agent actions "history_agent" comprise user actions and agent actions, respectively, e.g., in the last "k" turns (or k interaction cycles) of the conversational search, where k in an appropriate integer. In an example, the history of user actions "history_user" and the history of agent actions "history_agent" comprise user actions and agent actions through an entirety of a particular search episode (e.g., in this example, k is incremented to be equal to the length_conv). Using the history_user and the history_agent enables the AI module 128 to capture a context of the conversation between the user 101 and the agent 229 (e.g., in terms of sequence of actions taken), according to an embodiment.

A user-action vector (also referred to as "user vector") is represented as a vector of length "U," where U is a number of possible user actions. For example, in the example of Table 3, U is nine, i.e., the user-action is represented as a vector of length 9. For example, the vector having a value of

[010000000] for a conversation turn (where a conversation turn and a conversation interaction cycle discussed with respect to FIG. 2 are used interchangeably) indicates that the user action AU2 was implemented in that conversation turn. The history_user comprises such a series of vectors (e.g., for a corresponding series of conversation turns), sequentially indicating user actions at various points of the conversation between the user 101 and the agent.

Similarly, an agent-action vector is represented as a vector of length "V," where V is a number of possible agent actions. For example, in the example of Tables 1 and 2, V is twelve, i.e., there are twelve possible agent-actions. For example, the vector having a value of [001000000000] for a conversation turn indicates that the agent action AP3 was implemented for the conversation turn, and the vector having a value of [000100000000] for another conversation turn indicates that the agent action AG1 was implemented for the other conversation turn. The history_agent comprises such a series of vectors (e.g., for a corresponding series of conversation turns), sequentially indicating agent actions at various points of the conversation between the user 101 and the agent.

The history of the last k number of user and agent actions are represented as concatenation of these user-action vectors and agent-action vectors, where k is an appropriate integer (e.g., 10). Vectors with zero padding may be used wherever needed, e.g., when current history comprises less than k number of user and agent actions.

The variable score_results quantifies a degree of similarity between most recent query and the top N most relevant search assets retrieved, where N is an appropriate integer. In an example, the score_results may be included in the state representation, e.g., to incorporate the dependency between the relevance of probe intent actions and quality of search results retrieved. In an example, the variable length_conv may be included in the state representation, e.g., as appropriateness of some agent actions (e.g., sign up) may depend on a duration for which the user has been searching and carrying out conversation with the agent.

Rewards

As previously noted, Reinforcement Learning is associated with training an agent (e.g., an agent 229), in order to maximize some notion of cumulative reward. In general, an action taken at time t involves a long term versus short term reward trade-off, leading to an "exploration-exploitation" problem. This problem manifests itself even more severely in the context of conversational search. For instance, assume that the user 101 searches for "nature." Since the user 101 explicitly searched for something, it would seem logical that the most optimal action is to provide the search results associated with "nature" to the user 101, thereby reaping immediate reward for the agent 229. Alternatively, instead of going for immediate reward and showing some random images or results of nature, the agent 229 may further ask the user 101 clarifying questions to further narrow down the search. For example, the agent 229 may ask the user 101 if he or she is looking for "posters" or "portraits" of nature (or if he or she is looking for mountains, rivers, or forests), which can facilitate narrowing down the search in the long run. Determining an optimal or near-optimal action of the agent 229 at any point of the conversation is a non-trivial task, which highlights the importance of reward modeling. Asking for these clarifying questions may delay the reward of showing the final search results, but may increase incremental rewards.

Since the agent 229 aims to optimize dialogue strategy and to not generate dialogue utterances, the agent 229 is assigned rewards corresponding to the appropriateness of the action performed by the agent 229, e.g., considering the state and history of the search (e.g., history_user includes most recent user action to which the agent response is pending, in addition to remaining history of user actions).

In an example, the AI module 128 may use rewards, such as task success (e.g., based on implicit and explicit feedback from the user during the search). In an example, time or number of turns for the user 101 to search for desired results may not be penalized (e.g., negative rewards), e.g., as it may be possible that the user 101 is finding the interaction engaging and helpful in refining the results, which may increase number of conversations or iterations in the search. In an example, a total reward which the agent 229 receives in one complete dialogue (e.g., during a complete search session or search episode, as discussed with respect to the UI 300b) comprises one or more types of rewards (e.g., three types of rewards) and is expressed, in an example, in the form of following equation:

$$R_{total}(\text{search}) = r_{Task\ Completion}(\text{dialogue}) + \Sigma_{t \in turns}(r_{extrinsic}(t) + r_{auxiliary}(t))$$ Equation 1

Task Completion and Extrinsic Rewards

A first type of reward $r_{Task\ Completion}$ (also referred to as $r_{TC}$) of equation 1 is based on the completion of the task (Task Completion TC). As an example, for a search episode where search results can be downloaded and/or purchased, downloading and/or purchasing may be indicative of task completion. In another example, clicking on a search result may indicate task completion. In yet another example, clicking on an advertisement may indicate task completion. In general, when the user 101 performs an intended action of the agent, it may be considered as task completion. The task completion reward $r_{TC}$ is provided once during a search episode, e.g., at the end of the search episode, depending on whether the intended task is completed or not.

As second type of rewards of equation 1 is an extrinsic reward $r_{extrinsic}$. This reward may be awarded at individual conversation turns, and hence, this reward is a summation of the extrinsic rewards at various conversation turns. This reward may be provided based on a response that the user 101 provides subsequent to an agent action. User actions may be categorized into two or more feedback categories, such as good, average, bad, etc. (or may be scaled in a scale or 1 to 5, with 5 being best or as intended by the agent 229, and 1 being worst). For example, if the agent 229 prompts the user 101 to refine a search query and the user does follow the prompt, then the agent 229 receives a relatively high extrinsic reward $r_{extrinsic}$, e.g., because the user 101 played along with the agent 229. On the other hand, if the user 101 refuses to refine the search query, a relatively low (or zero, or even negative) extrinsic reward $r_{extrinsic}$ is awarded to the agent 229. A relatively moderate reward may be awarded if the user herself refines the query without any prompt from the agent 229. Depending on these feedback categories, extrinsic reward $r_{extrinsic}$ is awarded at every step or turn in the search episode (e.g., at turn t of the search episode, $r_{extrinsic}(t)$ may be rewarded; and at turn (t−1) of the search episode, $r_{extrinsic}(t-1)$ may be rewarded).

Auxiliary Rewards

Also included in equation 1 is auxiliary rewards $r_{auxiliary}$. For example, a set of auxiliary tasks T_A specific to the search problem may be defined, where individual ones of these tasks are used to provide additional reward r_auxiliary. Merely as an example, the set of auxiliary tasks T_A tasks may include one or more of clicking a search result, adding a result or product to cart, signing up with the search provided or signing in, clustering a search category, using a coupon provided as a part of the search, viewing a paid advertisement, etc. Thus, T_A={# click result, # add to cart, # sign up or sign in, # cluster category, # use coupons, # view advertisement}. The reward r_auxiliary is determined and rewarded at every (or various) turn in the search, based on the values of different auxiliary tasks metrics defined in T_A till that turn in the search. For example, completion of an auxiliary task may result in rewarding of this auxiliary rewards $r_{auxiliary}$. In an example, the auxiliary rewards $r_{auxiliary}$ promotes an action policy which improves the performance on these tasks.

Training RL Agent Through Stochastic User Model

In an example, the agent 229 is trained to learn the optimal action policy, which requires actual conversational search data with the user 101. When a large set of actual conversational search data is available, the agent 229 may be trained using such actual conversational search data. However, actual conversational search data may not be readily available for training the agent 229, as the agent 229 may not have been used previously in the context of the search task defined herein. In an example, to bypass this issue and bootstrap the training of the agent 229, a user model is used, where the user model simulates user behavior to interact with the agent 229 during training and validation of the agent 229. For example, a virtual user may be modeled based on search query and log sessions data.

In an example, a stochastic environment is developed, where the modeled virtual human user responds to agent actions of the agent 229. The virtual human user is modeled using some initial search query sessions data (e.g., which may be performed by real users 101), the corresponding user actions, and other interactions with the agent 229. This information is used to generate a virtual user, which simulates human behavior while searching and conversing with the agent 229 during search episodes. Individual records in the query log are mapped to one of the user actions as depicted in Table 5 below. Table 4 below illustrates an example mapping from session data to user action. To model the virtual user, query and session log data of approximately 20 days, merely as an example, are used.

TABLE 4

Example of mapping session data to user actions

| Session Data | Mapped User Action |
| --- | --- |
| shopping; content_type: all; NO_OFFSET; search | New query |
| shopping; content_type: all; 100; search | Request more |
| child while shopping; content_type: all; NO_OFFSET; search | Refine query |
| child while shopping; content_type: all; NO_OFFSET; click | Click result |
| child while shopping; content_type: landscape; NO_OFFSET; search | Cluster category click |

In Table 4, the session data comprises sequence of logs, where each log comprises search query, filters applied (e.g., content type), offset field and interaction performed by the user (such as search, click, etc.). The mapped user action are from the set of user actions discussed with respect to Table 3 herein earlier.

TABLE 5

Mapping between query logs and user actions

| User action | Mapping used |
| --- | --- |
| new query | first query or most recent query with no intersection with previous ones |
| refine query | query searched by user has some intersection with previous queries |
| request more | clicking on next set of results for same query |
| click result | user clicking on search results being shown |
| add to cart | when user adds some of searched assets to her cart for later reference |
| cluster category click | when user clicks on filter options like orientation or size |
| search similar | search assets with similar series, models, etc. |

The virtual user is modeled as a finite state machine by extracting conditional probabilities P(User Action u|History h of User Actions). These probabilities are employed for sampling next user action, given the fixed length history of the user actions in a search episode. The agent 229 performs an agent action in response to the sampled user action. Subsequent to the agent action performed by the agent 229, next user action is sampled, which modifies the state and is used to determine the reward the agent 229 receives for its previous action. Table 6 shows a snippet of conditional probability matrix of user actions, given the history of last three (for example) user actions.

TABLE 6

Snippet of conditional probability matrix obtained from session data on query logs

| User action | User Action History | P(user action/history) |
| --- | --- | --- |
| Click assets | More assets, click assets, similar click | 0.41 |
| More assets | New query, refine query, add to cart | 0.13 |
| Refine query | similar click, new query, new query | 0.40 |

In an example, the query and session log data are taken from an asset search platform, e.g., where the marketer can define certain offers and/or promotions, which kick in when the user takes certain actions. For example, the user can be prompted to add some images to a cart (e.g., via a pop-up box). A user's response to such prompts on the search interface is used as a proxy to model the effect of agent 229 on the virtual user's sampled action, subsequent to different probe actions by the agent 229. This ensures that the conditional probability distribution of the user action by the virtual user covers a whole probability space of user behavior. In order to incorporate the effect of other agent actions (e.g., such as sign up, which are not present in the query logs), the probability distribution may be altered realistically in order to bootstrap and train the agent 229.

A3C Algorithm, Using RL

In an embodiment, the A3C algorithm generates an actor output and a critic output, wherein the actor output includes the possible actions the RL-based agent can take, and the critic output includes the state of the search session. Recall that the state effectively encodes the agent actions and user actions in the last k cycles of the search session, actor output includes the possible actions the RL-based agent can take, and the critic output includes the state of the search session. In more detail, in the A3C algorithm, a value function $V_\pi$ and a stochastic policy $\pi$ as a function of the state is maintained. The policy $\pi : A \times S \to R$ defines a probability distribution $\pi$ (a|s) over the set of agent actions, e.g., which the agent may take in a state s. This probability distribution is used to sample agent action, given the state. The value function V: S×R represents an expected cumulative reward from current time step in an episode if policy $\pi$ is followed after observing state s. For example, V $\pi$ (s)=E[Q(s, a)], where the expectation "E" is taken with respect to probability distribution over the set of actions in different states while following policy $\pi$.

Search Context Preserving A3C Architecture

Figure 4:
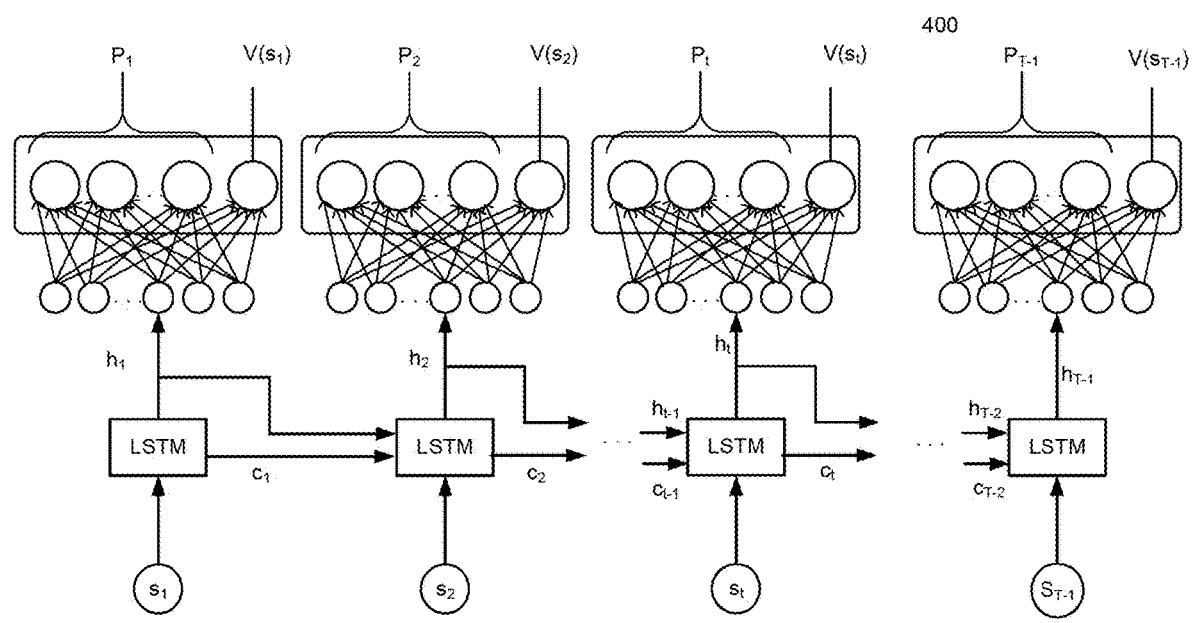
FIG. 4 illustrates a neural network architecture that may be used for Artificial Intelligence (AI) module of FIGS. 1 and 2, and specifically, to implement the agent used for interactive search, in accordance with some embodiments.

FIG. 4 illustrates a neural network architecture 400 that may be used for AI module 128, and specifically, to implement agent 229 used for interactive search, in accordance with some embodiments. In an example, A3C architecture is used in FIG. 4, e.g., for predicting action policy $P_t$ and value $V(s_t)$. Current search state $s_t$ is processed by a Long short-term memory (LSTM) followed by a fully connected layer. A cell state $c_t$ and hidden state $h_t$ of LSTM from previous time step is retained while processing the next state during a search episode. The same fully connected layer is used for prediction at different time steps in a search episode. The search episode terminates at time step T. The architecture 400 preserves context of conversational search for approximating the policy $P_t$ and value functions $V(s_t)$. As previously discussed, the architecture 400 comprises the LSTM, which processes the state at a time step t (input $i\_t = s_t$) and generates an embedded hidden state $h_t$. The hidden state $h_t$ is further processed through a fully connected layer to predict the probability distribution over different actions using a softmax function and the value of the input state.

The policy $P_t$ is a vector of length equal to a number of possible agent actions. For example, as discussed with respect to Tables 1 and 2, there may be 12 possible agent actions, and for this example, the policy $P_t$ is a vector of length 12. Each value of this vector indicates a probability of a corresponding agent function to be undertaken. For example, if P1 is equal to [0, 0.7, 0, 0, 0, 0, 0, 0, 0.1, 0, 0.2, 0], then a second agent action is to be undertaken by the agent 229 (e.g., the second action corresponding to a second value of 0.7 in the vector P1, where the second value is a maximum of all the values of the vector P1). It may be noted that a sum of all values of the vector P1 is equal to 1. An individual value represents a probability of a corresponding action to be undertaken. As discussed with respect to Tables 1 and 2, the second agent action may be AP2, which is "Probe to refine." Hence, at time t=1, the agent 229 performs the "Probe to refine", i.e., asks the user 101 to refine the search query. Thus, the architecture 400 outputs, at each step of the conversation, a corresponding policy $P_t$, wherein the policy $P_t$ is a probability vector (also referred to as a policy vector) that predicts a plurality of probability values associated with a corresponding plurality of agent actions. An agent action is selected from the plurality of actions, based at least in part on the probability vector. In an example, the value function $V(s_t)$ provides an estimation of how appropriate the state is for the step t, e.g., provide a measure of a goodness of a state at a given point in the conversational search. For example, the value function $V(s_t)$ provides an estimation of goodness or effectiveness of the input state $s_t$. P The following equations generally describe the architecture 400:

$$h\_t = f(w\_LSTM; s\_t) \quad \text{Equation 2}$$

$$o\_p\_t = f(\Theta\_p; h\_t) \quad \text{Equation 3}$$

$$p\_t = softmax(o\_p\_t) \quad \text{Equation 4}$$

$$v\_s\_t = f(\Theta\_v; h\_t) \quad \text{Equation 5,}$$

where w_LSTM represents parameters of the LSTM, $\Theta\_p$ and $\Theta\_v$ represent the set of parameters of the last fully connected layer which outputs the policy P and value $V(s_t)$ of the input state $s_t$, respectively. The parameters are represented by $\Theta = \{w\_LSTM; \Theta\_p; \Theta\_v\}$. The LSTM state is reset to zero vectors at the start of a search episode. At time-step t in the search episode, the state $s_t$ is given as input to the model. The cell state $c_{(t-1)}$ and hidden state $(h_{t-1})$ of the LSTM is maintained based on the previous states $(s_0; s_1; \ldots; s_{t-1})$, which have already been processed. The LSTM unit remembers the previous states, which enables the architecture 400 to capture the effect of observed states in the search while predicting the probability of different agent actions. This memory of the LSTM implicitly allows the agent 229 to make the next prediction, e.g., based on the transitions and user behavior observed so far. This allows the architecture 400 (i.e., the agent 229) to mimic the strategy of a real agent assisting the user 101.

The parameters of the architecture 400 are tuned by, for example, optimizing the loss function loss_total, which can be decomposed into two or more types of losses. An example of the loss function loss_total is:

$$loss\_total(\Theta) = loss\_policy(\Theta) + loss\_value(\Theta) + loss\_entropy(\Theta) \quad \text{Equation 6.}$$

Thus, in an example, the loss function loss_total comprises three types of loss, as seen in equation 6. In A3C algorithm, the agent 229 is allowed to interact with the environment to roll-out a search episode. The network parameters are updated after completion of every n-steps in the roll-out. An n-step roll-out, when the current state is $s_t$ (where the current state is $s_t$ is also referred to as s_t in below equations) may be expressed as:

$$(s\_t, a\_t, r\_t, s\_\{t+1\}, v\_\{s\_t\}) \to (s\_\{t+1\}, a\_\{t+1\},$$
$$r\_\{t+1\}, s\_\{t+1\}, v\_\{s\_\{t+1\}\}) \to \ldots \to (s\_\{t+$$
$$n-1\}, a\_\{t+n-1\}, r\_\{t+n-1\}, s\_\{t+n\}, v\_\{s\_\{t+n-$$
$$1\}\}). \quad \text{Equation 7}$$

The function $V(s\{t \pm n\}; \Theta)$ is calculated in order to estimate loss_value, which is defined as:

$$loss\_value(\Theta) = (V\_target(s\_i) - V(s\_i, \Theta))^2,$$
$$\text{for } i = t, t+1, \ldots, t+n-1 \quad \text{Equation 8}$$

where $V\_target(s\_i) = \Sigma Y_k r_{k+1} + Y_{n+t-i} V(s\_t+n; \Theta)$, and summation is carried over k=0 to t+n-i-1. The vatable Y is a discount factor of the architecture 400.

Thus, an n-step roll-out allows to estimate the target value of a given state using the actual rewards realized and value of the last state observed at the end of the roll-out. Value of a terminal state s_T is defined as 0. Each roll-out yields n samples to train the network on the value loss function using these estimated values.

In a similar way, the network is trained on loss_policy which is defined as:

$$loss\_policy(\Theta) = -\log(p(a\_i|s\_i; \Theta))*A(a\_i; s\_i; \Theta), \text{ for }$$
$$i = t, t+1, \ldots, t+n-1 \text{ where } A(a\_i; s\_i; \Theta) =$$
$$\Sigma Y_k r_{k+i} + Y_{n+t-i} V(s\_t+n; \Theta) - V(s_i; \Theta), \text{ and summation is carried over } k=0 \text{ to } t+n-i-1 \quad \text{Equation 9}$$

The above loss function tunes the parameter, in order to shift the policy in favor of agent actions that provide better advantage A(a_t, s_t, $\Theta$), given the state s_t. This advantage can be interpreted as additional reward the agent 229 receives by taking action a_t in state s_t over the average value of the state V(s_t; $\Theta$) as the reference. However, this may bias the agent 229 towards a particular or few actions, due to which the agent 229 may not explore other actions in a given state. To prevent or reduce such a possibility, in an example, an entropy loss is added to the total loss function, which aims at maximizing the entropy of probability distribution over actions in a state, where the entropy loss is given by:

$$\text{loss\_entropy}(\Theta) = -\Sigma - p(a|s\_i;\Theta) * \log(p(a|s\_i;\Theta)), \text{ for } i=t,t+1,\ldots,t+n-1 \quad \text{Equation 10}$$

The total loss function loss_total incorporates exploitation-exploration balance through policy and entropy loss functions optimization. The value function $V\_\pi(s)$ is used for determining value of a state to be used as reference while determining advantage of different actions in loss_policy. In an example, Adam optimizer may be used for optimizing the loss function on model parameters $\Theta$. To improve the exploration capacity of the final agent trained, A3C comprises a global model and uses multiple asynchronous agents, which interact with their own copy of environment in parallel. Each agent uses its local gradients of the loss function with respect to model parameters to update the parameters of the global model, and then copies the parameters of the global model for subsequent training. This is repeated after completion of every fixed number of episodes for each agent, which results in relatively faster convergence.

Capturing Search Context at Local and Global Level

Including vectors, which encode the history of agent actions and user actions in the last "k" turns of the search in the state captures the "local context" of the search episode. User behavior at current time-step can be affected by queries far away in the history. Since the search episode may arguably extend indefinitely, local context may not be sufficient to capture this behavior. The LSTM unit in the architecture 400 aggregates the local context as it sequentially processes the states in an episode into a global context, which results in capturing context at a global search level.

Evaluation Using User Model

In an example, the trained model of the agent 229 may be evaluated against the virtual user model, and the validation results may be compared for different state representations (e.g., see FIGS. 6A-6C discussed herein later) for conversational search, different hyper-parameter settings (such as discount factor $\Upsilon$, which affects exploration vs exploitation trade-off, see FIG. 5A discussed herein later), and the LSTM size (e.g., which controls the context preserving capacity of the architecture 400, see FIG. 5B discussed herein later).

Varying Discount Factor

Figure 5A:
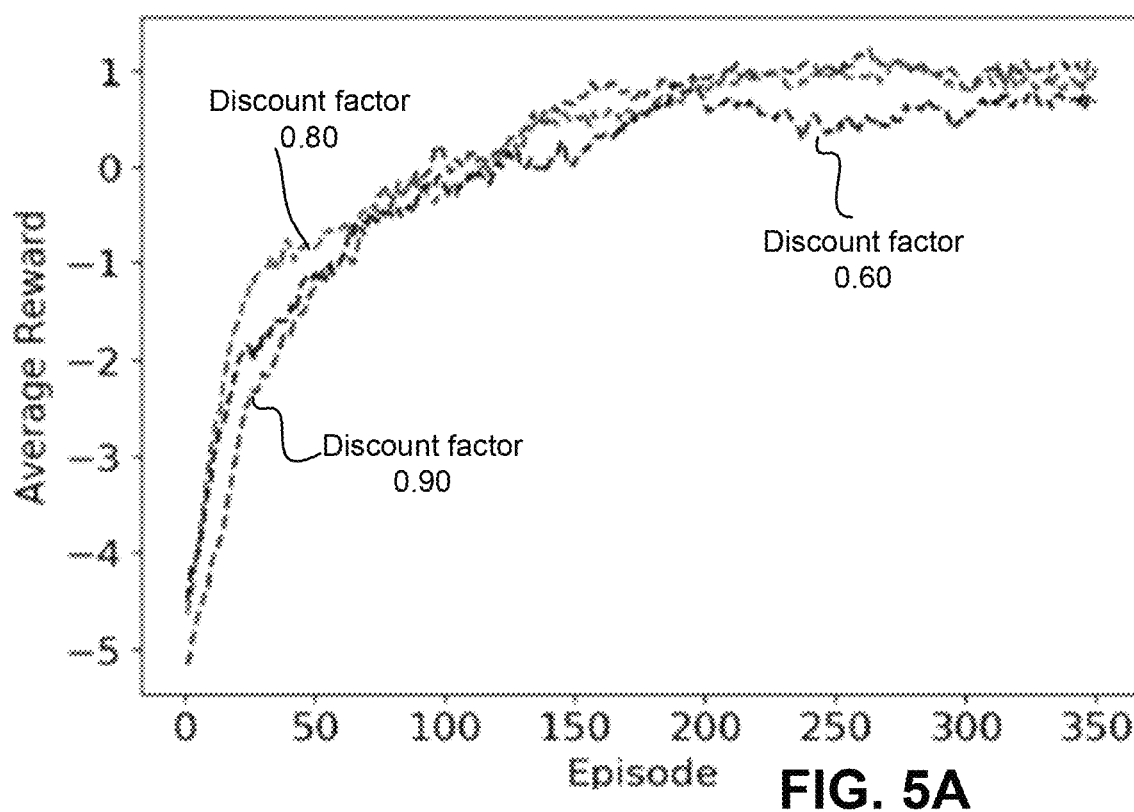
FIG. 5A illustrates three plots, each representing average reward of an agent for a varying number of search episodes, and the plots are for three different values of a discount factor, in accordance with some embodiments.

FIG. 5A illustrates plots representing average reward (Y axis) of the agent 229 for a varying number of episodes (X axis). The plots are for three values of discount factor and for fixed LSTM size of 250, in accordance with some embodiments. As seen, higher discount factor (i.e., lower value of $\Upsilon$) results in lower weights for the future rewards. With a large discount factor, the agent 229 tries to maximize the immediate rewards by taking the greedy actions, since future rewards are discounted to a larger extent. This was validated by computing the variance in the results for each case. The values for fewer than 100 episodes were not considered as the network architecture 400 is under-fitting in that region. The variance values for the 3 cases (i.e., $\Upsilon$ =0.90, 0.70, 0.60) are 1.5267, 1.627, and 1.725, respectively, in an example. Since the agent 229 takes more greedy actions with higher discount factors, the variance in the reward values also increases, e.g., since the greedy approach yields good rewards in some episodes and bad rewards in others.

Varying Memory Capacity

Figure 5B:
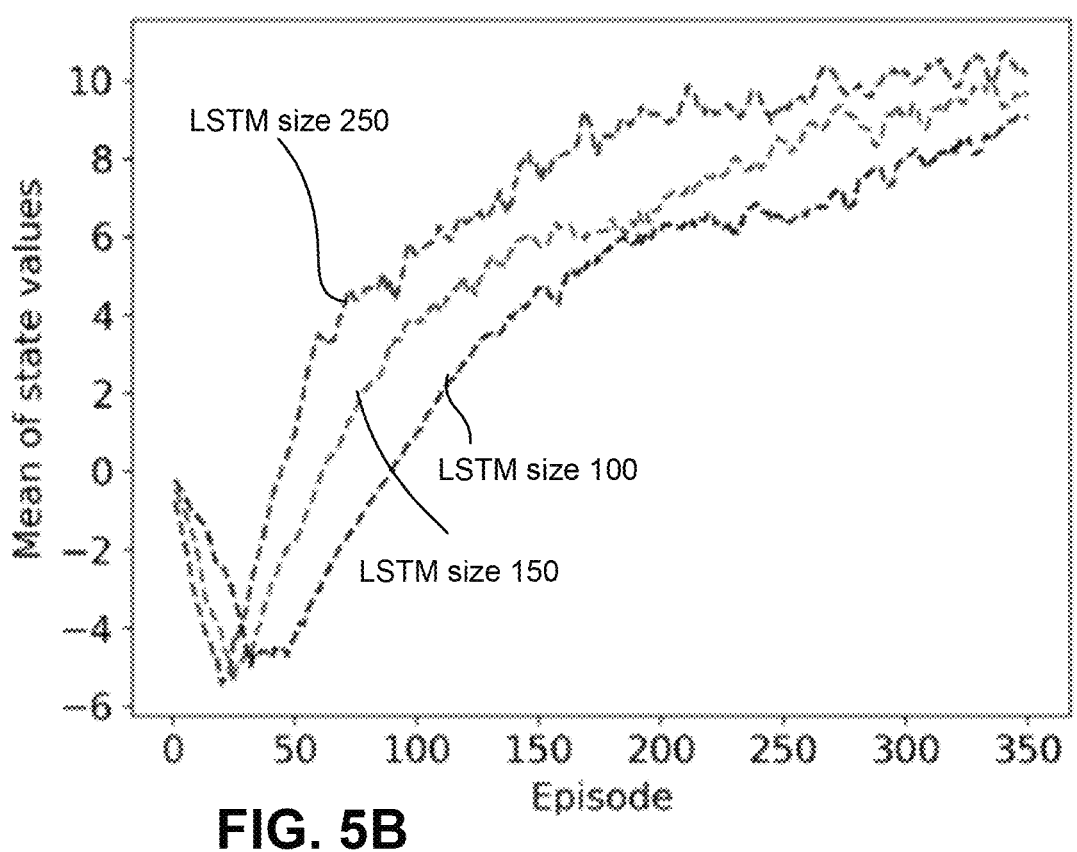
FIG. 5B illustrates three plots, each representing a mean value of states observed in a search episode of an agent for a varying number of episodes, and the plots are for three example sizes of Long short-term memory (LSTM), in accordance with some embodiments.

FIG. 5B illustrates plots representing a mean value of states observed in a search episode (Y axis) of the agent 229 for a varying number of episodes (X axis), and the plots are for three example sizes of LSTM (e.g., 100, 150, 250), in accordance with some embodiments. The discount factor is fixed at 0.90. It is observed that larger size of the LSTM results in better states which the agent observes on an average, e.g., as the average state value is higher. This demonstrates that a bigger LSTM size provides better capacity to remember the context results in the agent 229 performing actions, which yield improved states in the search episode.

Different State Representations

Figure 6A:
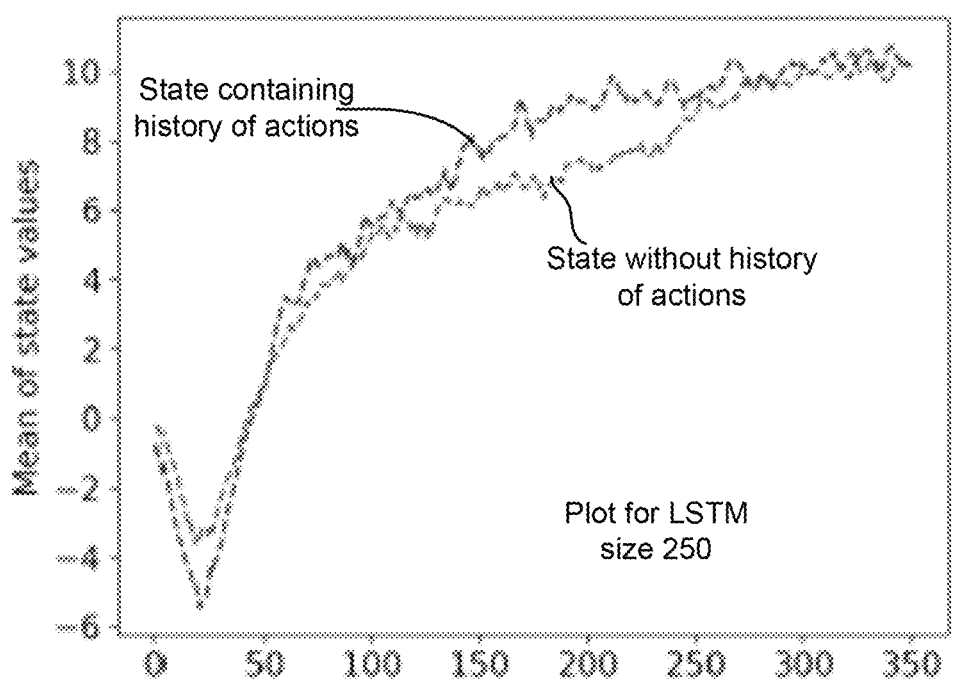
FIG. 6A illustrates first and second plots contrasting mean state values observed for a varying number of search episodes and for a LSTM size 250, with one plot representing state values that contain history of actions and the other plot showing state values without history of actions, in accordance with some embodiments.
Figure 6B:
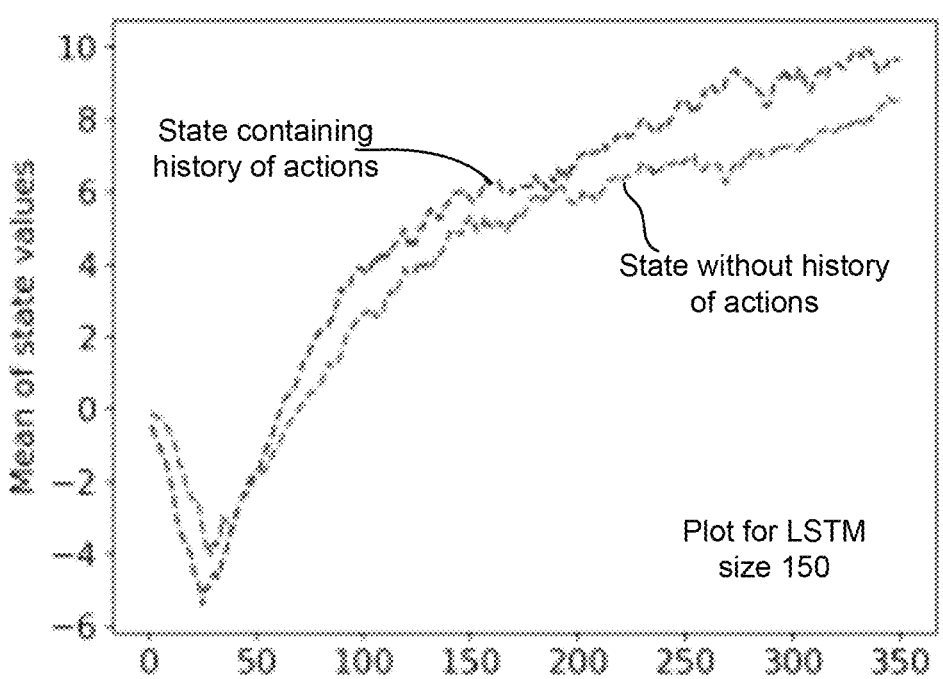
FIG. 6B illustrates first and second plots contrasting mean state values observed for a varying number of search episodes and for a LSTM size 150, with one plot showing state values that contain history of actions and the other plot showing state values without history of actions, in accordance with some embodiments.
Figure 6C:
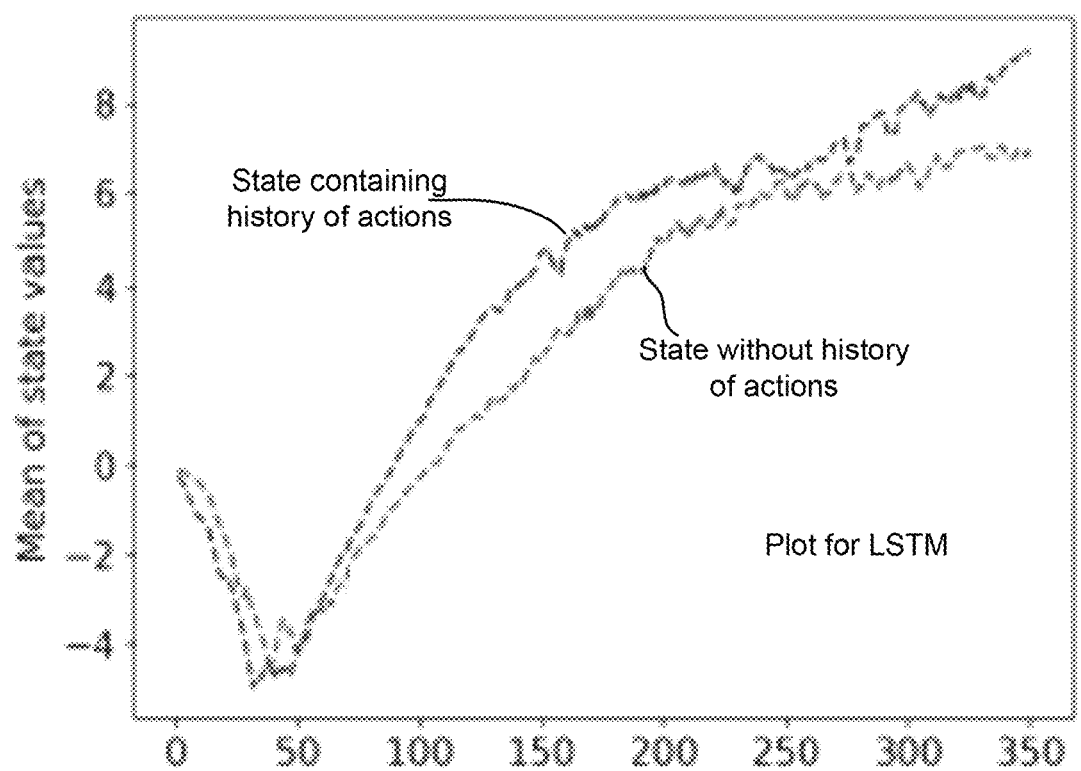
FIG. 6C illustrates first and second plots contrasting mean state values observed for a varying number of search episodes and for a LSTM size 100, with one plot showing state values that contain history of actions and the other plot showing state values without history of actions, in accordance with some embodiments.

In this experiment, the state vectors were modeled with and without incorporating the two action history vectors, e.g., history_user and history_agent. FIG. 6A illustrates a plot representing a mean state values observed for a varying number of episodes and for a LSTM size 250, FIG. 6B illustrates a plot representing a mean state values observed for a varying number of episodes and for a LSTM size 150, and FIG. 6C illustrates a plot representing a mean state values observed for a varying number of episodes and for a LSTM size 100, in accordance with some embodiments. Each of FIG. 6A, 6B, 6B compares a scenario where the history of actions is added to state vector with another scenario where the history of actions is not added.

For large LSTM size 250 (i.e., FIG. 6A), the history need not be explicitly added to the state, as the LSTM is able to preserve the context and eventually achieves substantially the same mean state values. But if the LSTM does not have enough capacity, as in case of LSTM size 100 (FIG. 6C), the mean state values observed with history vector included in the state is more than when it is not included. This demonstrates that including the local context in state representation is useful to enable the architecture to aggregate it into global context.

Example Methods of Operation

Figure 7:
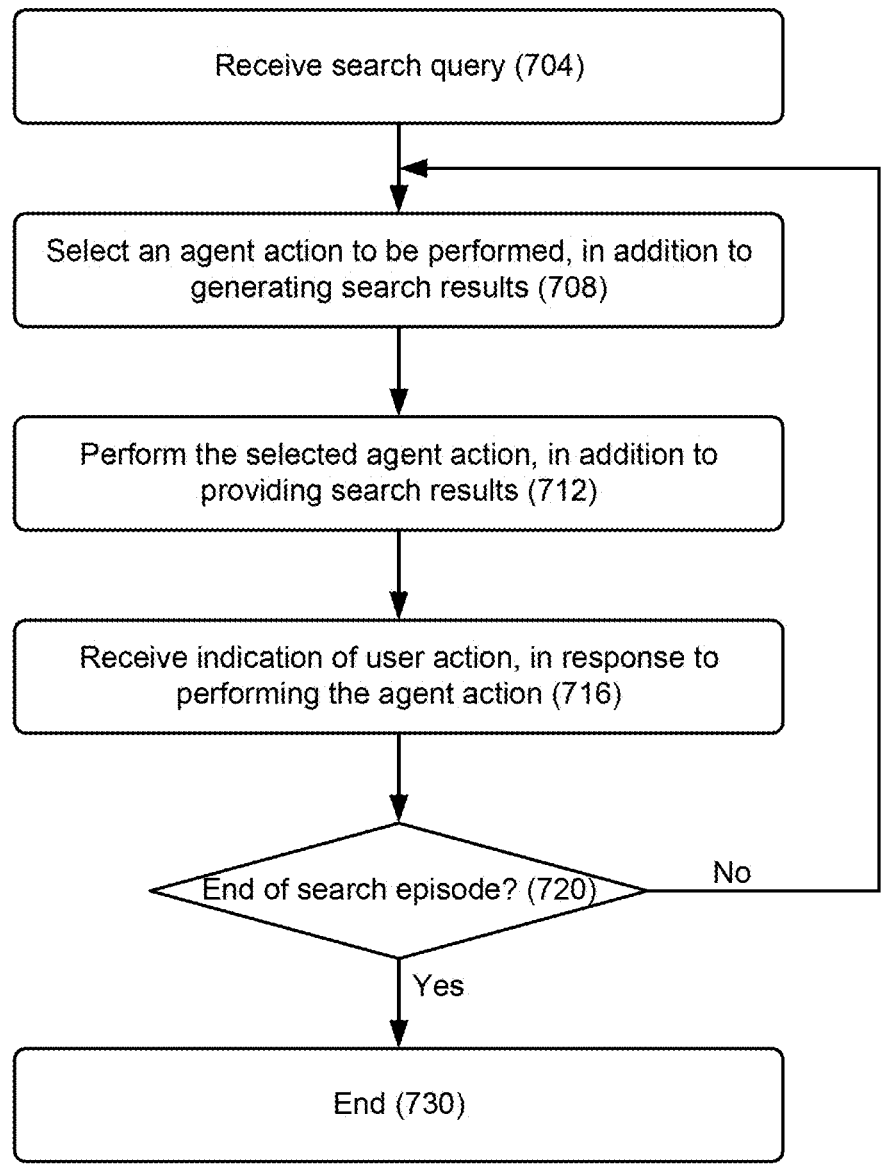
FIG. 7 is a flowchart illustrating an example method for interactive search, in accordance with some embodiments.

FIG. 7 is a flowchart illustrating example method 700 for facilitating interactive search, in accordance with some embodiments. Method 700 can be implemented, for example, using the system architecture illustrated in FIG. 1 and described herein. However other system architectures can be used in other embodiments, as will be apparent in light of this disclosure. To this end, the correlation of the various functions shown in FIG. 7 to the specific components and functions illustrated in FIGS. 1 and 2 is not intended to imply any structural and/or use limitations. Rather, other embodiments may include, for example, varying degrees of integration wherein multiple functionalities are effectively performed by one system. In another example, multiple functionalities may be effectively performed by more than one system. For example, in an alternative embodiment, a first server may provide the search module functionality, and a second server may provide the artificial intelligence module functionality. Thus, other embodiments may have fewer or more modules depending on the granularity and distributive nature of the implementation. Numerous variations and alternative configurations will be apparent in light of this disclosure.

As illustrated in FIG. 7, the example method 700 includes, at 704, receiving a search query, e.g., by the server 110 from the user 101 via the device 102. For example, the user 101 may enter the search query via the UI 300b of FIG. 3B or 3C (or via the UI 300a of FIG. 3A). Merely as an example, the search query entered by the user 101 is related to "images of mountains," as illustrated in FIG. 3B.

Figure 8:
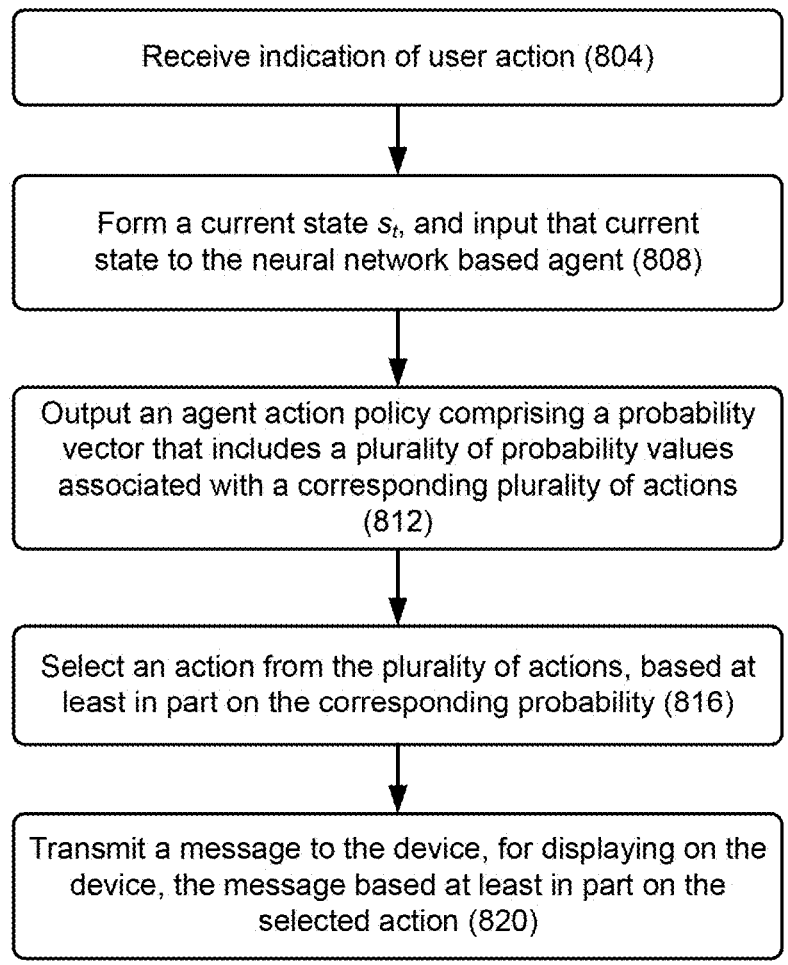
FIG. 8 is a flowchart illustrating further details with respect to the example method of FIG. 7, including methodologies for selecting and implementing an agent action during a single interaction cycle of the interactive search, in accordance with some embodiments.

At 708, the server 110 (e.g., the agent 229) selects an agent action to be performed, and also generates search results to the search query. For example, the agent 229 generates the probability vector P1 as discussed with respect to FIG. 4, and selects an agent action (e.g., from the Tables 1 and 2) based on the probability vector P1, as further discussed with respect to FIG. 4. Merely as an example, the selected agent action may be to probe the user to refine the query (action AP2 of Table 1). FIG. 8 explains further details as to how the selection of agent action is carried out, according to an embodiment, and will be discussed in turn.

At 712, the server 110 performs the selected agent action, in addition to providing search results. For example, the NLP module translates the agent action into text that is understandable to the user 101. Merely as an example, the selected agent action may be to probe the user to refine the query (action AP2 of Table 1), which the NLP module may translate to "We also have many images in these categories, should I show you some?" In another example, the NLP module may translate the agent action to: "Would you like to see images of snow covered mountains, or forest covered mountains?" The translated agent action is transmitted to the search and chat interface module 156, e.g., for displaying in the chat window 310 of the UI 300b. Additionally, in an example, search results may be displayed in the search window 314.

At 716, the server 110 may receive indication of user action, in response to performing the agent action. Merely as an example, in response to the agent action of probing the user to refine the query, such as by specifying one or more relevant sub-categories of search, the user may refine the query (or may refuse to refine the query). For example, in FIG. 3B, the user refines the query to indicate that he or she is interested in "nature mountains." The user may also choose to terminate the search episode.

At 720, the server 110 checks to see if the search episode is ended (e.g., due to the user 101 actively terminating the search episode by closing the UP 300b, due to the user selecting a search result and thereby ending the search episode, due to the user purchasing an asset from the search result and thereby ending the search episode, and/or the like). If "Yes" at 720 (i.e., the search episode is ended), the method 700 terminates at 730. If "No" at 720 (i.e., the search episode has not ended), the method 700 loops back to 708, where the agent 229 selects another agent action (e.g., in response to the user action of 716), and the interaction between the user 101 and the agent 229 continues.

FIG. 8 is a flowchart illustrating further details with respect to the example method of FIG. 7, including methodology 800 for selecting and implementing an agent action during a single interaction cycle of the interactive search, in accordance with some embodiments. The methodology can be implemented, for example, using the system architecture illustrated in FIG. 1 and described herein. However other system architectures can be used in other embodiments, as will be apparent in light of this disclosure. To this end, the correlation of the various functions shown in FIG. 8 to the specific components and functions illustrated in FIGS. 1 and 2 is not intended to imply any structural and/or use limitations. Rather, other embodiments may include, for example, varying degrees of integration wherein multiple functionalities are effectively performed by one system. In another example, multiple functionalities may be effectively performed by more than one system. For example, in an alternative embodiment, a first server may provide the search module functionality, and a second server may provide the artificial intelligence module functionality. Thus, other embodiments may have fewer or more modules depending on the granularity of implementation. Numerous variations and alternative configurations will be apparent in light of this disclosure.

As illustrated in FIG. 8, the example method 800 includes, at 804, receiving an indication of user action. The user action can be the user entering an initial search query, refining the search query, requesting more search results, clicking a search result, or any of the user actions discussed with respect to Table 3. The operations at 804, in an example, are similar to the operations at 716 of the method 700.

At 808, a current state $s_t$ of the neural network architecture 400 is formed and input to the architecture 400, e.g., as discussed with respect to FIG. 4. For example, the current state $s_t$ includes most recent user action (or a history of user actions), most recent agent action (or a history of agent actions), discretized relevance scores of search results, a length of conversation so far between the agent 229 and the user, and/or any information relevant for the agent 229 to make an informed decision on the agent action policy. Any combination of such factors may be considered.

At 812, the architecture of FIG. 400 outputs an agent action policy $P_t$, e.g., as discussed in further detail with respect to FIG. 4. In an example, the agent action policy $P_t$ comprises a probability vector that includes a plurality of probability values associated with a corresponding plurality of actions. Merely as an example and as discussed with respect to FIG. 4, $P_t$ may be equal to [0, 0.7, 0, 0, 0, 0, 0, 0, 0.1, 0, 0.2, 0]. The twelve values of this vector respectively correspond to the twelve agent actions discussed with respect to Tables 1 and 2. It may be noted that a sum of all values of the vector $P_t$ is equal to 1 in an example. An individual value represents a probability of a corresponding action to be undertaken.

At 816, an action from the plurality of agent actions is selected, based at least in part on the corresponding probability included in the vector. For example, continuing with the above example where the probability vector is [0, 0.7, 0, 0, 0, 0, 0, 0, 0.1, 0. 0.2, 0], each of these values represent a probability of the corresponding agent action to be selected and executed. A maximum of these twelve values of the vector is identified, and an agent action corresponding to the identified value is selected. Thus, in this example, a second agent action AP2 (see Table 1) is selected by the agent 229. As will be appreciated, the operations at 816 of method 800 further explain the operations at 708 of the method 700.

At 820, the agent 229 executes the selected agent action. For example, the agent 229 selects a message based on the selected action, and transmits the message (e.g., after parsing the message through the NLP engine 126) to the device 102, for displaying on the device 102. For example, in the above discussed example, the second agent action AP2 is associated with "Probe to refine," as discussed with respect to Table 1. Thus, the message is regarding probing the search query. For example, the message is "Where will you use these images?," as seen in the UI 300b of FIG. 3B. As will be appreciated, the operations at 820 of the method 800 further explain the operations at 712 of the method 700.

The method 800 is repeated, as long as the conversation between the user 101 and the agent 229 continues, and until an optimal action policy maximizes cumulative reward that the agent gets, based on the actions taken according to the policy from start until the final terminal state is reached in the episode. As will be appreciated, the method 800 illustrates a single interaction cycle, and the method 800 is repeated for each of the multiple interaction cycles undergone during the search episode. It is this iterative process that allows the agent to meaningfully engage the user to explore context and details of the search.

As discussed herein, the search agent 229 assistant can be used to interact with the user 101, for helping the user 101 to search through the search database, while providing personalized recommendations, thereby making the environment an interactive recommendation plus search system. In an example, the user 101 may possibly make an open-ended query, which may result in a diverse set of results, even though none of the results may be a good match. In such scenarios, the agent 229 prompts the user to refine the search query, or add additional details (e.g., such as where the search results would be used), in addition to providing recommendations. In an individual search turn (or interaction cycle), the agent 229 tries to gauge user intent, and select an agent action accordingly. These interactive actions serve multiple purposes, e.g., carry the conversation between the user and the agent further, provide various cues about the search context (e.g., which may not be evident from the search query provided by the user), etc. The agent 229 may also promote the business use cases of the search provider (e.g., prompting the user to sign-up with an email, purchase or download assets, etc.), depending upon appropriateness of such actions with respect to the search history so far.

Although the UIs 300b of FIGS. 3B and 3C indicate interactive communication between the user 101 and the agent 229 via written messages, the user 101 may also interact with the agent using audio messages. For example, a speaker of the device 102 may output a response of the agent 229, and the user 101 may input his or her response (or search query) using a microphone of the device 102, as would be appreciated by those skilled in the art based on the teachings of this disclosure.

Various embodiments and examples of this disclosure are directed to using A3C reinforcement learning for training a search agent (e.g., the agent 229), which can assist users in their subjective search. The architecture discussed herein effectively facilitates interaction with the users, e.g., to understand search context. The architecture models policies (e.g., vectors $P_1, \ldots, P_T$ of FIG. 4), which the agent 229 follows while assisting the user. The architecture is able to measure the goodness of state at any given point in conversational search, e.g., using value $V(s_t)$ of FIG. 4. The architecture uses set of actions (e.g., user actions, agent actions), states, and rewards for modeling interactive search through the RL environment and for training the RL-based agent 229. Query and session log data to different "real" user actions may be used to formulate a user model, which can be used to simulate a virtual user. The virtual user may be used for bootstrapping the training of the agent 229.

Numerous Variations and Configurations will be Apparent in Light of this Disclosure.

Example 1 includes a method for providing an interactive search session, the method comprising: receiving a search query from a device, the search query provided by a user; generating, based at least in part on the search query, a probability vector that includes a plurality of probability values associated with a corresponding plurality of actions; selecting an action from the plurality of actions, based at least in part on a probability value corresponding to the selected action; and transmitting a message to the device, for displaying on the device, the message based at least in part on the selected action, wherein the message is different from results of the search query and solicits further information from the user.

Example 2 includes the subject matter of Example 1, wherein the selected action is a first selected action, the method further comprising: receiving a user response to the message from the device; generating, based at least in part on the user response, another probability vector that includes another plurality of probability values associated with the corresponding plurality of actions; selecting a second action from the plurality of actions, based at least in part on a probability value corresponding to the second selected action; and transmitting another message to the device, based at least in part on the second selected action.

Example 3 includes the subject matter of Example 2, the method further comprising: iteratively repeating receiving a user response, generating another probability vector, selecting a corresponding action from the plurality of actions, and transmitting a corresponding message to the device, until an end of the search session is identified.

Example 4 includes the subject matter of any of Examples 1-3, wherein the selected action and the message are to request additional information about the search query, or to request to refine the search query.

Example 5 includes the subject matter of any of Examples 1-4, the method further comprising: causing the device to display search results of the search query on the device simultaneously with a display of the message on the device.

Example 6 includes the subject matter of any of Examples 1-5, wherein the probability vector is generated by an artificial intelligence model.

Example 7 includes the subject matter of any of Examples 1-6, wherein the probability vector is generated by a Reinforcement Learning (RL) model that operates on an Asynchronous Advantage Actor-Critic (A3C) algorithm.

Example 8 includes the subject matter of any of Examples 1-7, wherein the probability vector is generated by a Reinforcement Learning (RL) model, and wherein the method comprises: training the RL model by causing the RL model to interact with a virtual user, wherein the virtual user is modelled using conversation history of the RL model with one or more actual users.

Example 9 includes the subject matter of any of Examples 1-8, wherein the probability vector is generated by a Reinforcement Learning (RL) model, and wherein the method comprises: training the RL model using rewards, wherein rewards awarded during a search episode include a first reward for successful completion of the search episode, a second reward, based on user response to an action selected by the RL model, and a third reward for completion of an auxiliary task identified by the RL model.

Example 10 includes the subject matter of any of Examples 1-9, the method further comprising: iteratively repeating generating a probability vector and selecting a corresponding action, wherein the probability vector is generated by a Reinforcement Learning (RL) model; and defining, at each interaction cycle of the interactive search session, a corresponding state of the RL model, wherein the state at a specific interaction cycle includes one or more of at least a partial history of actions selected so far in the interactive session, at least a partial history of responses received from the device so far in the interactive session, and/or a length of the interactive session so far.

Example 11 includes the subject matter of Example 10, wherein at least the partial history of actions selected so far in the interactive session comprises a plurality of action vectors, wherein each action vector is indicative of a corresponding action undertaken during a corresponding interaction cycle of the interactive session.

Example 12 includes the subject matter of any of Examples 10-11, wherein at least the partial history of responses received from the device so far in the interactive session comprises a plurality of user vectors, wherein each user vector is indicative of a corresponding response received during a corresponding interaction cycle of the interactive session.

Example 13 includes a system comprising: one or more processors; a processing module executable by the one or more processors to receive a message from a device and to parse the message, the message comprising at least one of: a search query, or a response from a user during an interaction of the user with the system, the interaction is to generate results of the search query; a search engine to receive the parsed message, and to generate search results based on the parsed version of the message; and an artificial intelligence module executable by the one or more processors to receive the parsed message and the search results, generate a vector including a plurality of values associated with a corresponding plurality of actions, based on the parsed message and the search results, and select a first action of the plurality of actions, based on the vector.

Example 14 includes the subject matter of Example 13, wherein the processing module is a natural language processing (NLP) module, and wherein processing module is to: receive an indication of the selection of the first action; generate a system message, based on the indication of the selection of the first action; and cause the system message to be transmitted to the device, for displaying on the device.

Example 15 includes the subject matter of Example 14, wherein the system message includes the search results.

Example 16 includes the subject matter of any of Examples 14-15, wherein the system message includes a request for more information about the search query.

Example 17 includes the subject matter of any of Examples 14-16, wherein the system message includes a request to refine the search query.

Example 18 includes the subject matter of any of Examples 14-17, wherein the system message includes a request to select one of a plurality of categories of results of the search query.

Example 19 includes the subject matter of any of Examples 13-18, wherein the artificial intelligence module implements a Reinforcement Learning (RL) model that operates on an Asynchronous Advantage Actor-Critic (A3C) algorithm.

Example 20 includes the subject matter of Example 19, wherein the artificial intelligence module is to: train the RL model by causing the RL model to interact with a virtual user, wherein the virtual user is modelled using conversation history of the RL model with one or more real users.

Example 21 includes the subject matter of any of Examples 19-20, wherein the artificial intelligence module is to: train the RL model using rewards, wherein rewards awarded during a search episode include a first reward for successful completion of the search episode, a second reward, based on user response to an action selected by the RL model, and a third reward for completion of an auxiliary task identified by the RL model.

Example 22 includes the subject matter of any of Examples 19-21, wherein the artificial intelligence module is to: define a state of the RL model, wherein the state includes one or more history of actions selected during a current interactive search session, history of messages received from the device in the current interactive search session, and/or a length of the current interactive session.

Example 23 includes the subject matter of Example 22, wherein the history of actions selected in the current interactive session comprises a plurality of action vectors, wherein each action vector is indicative of a corresponding action undertaken during a corresponding interaction cycle of the current interactive session.

Example 24 includes the subject matter of any of Examples 22-23, wherein the history of responses received from the device in the current interactive session comprises a plurality of user vectors, wherein each user vector is indicative of a corresponding message received during a corresponding interaction cycle of the current interactive session.

Example 25 includes a computer program product including one or more non-transitory machine-readable mediums encoded with instructions that when executed by one or more processors cause a process to be carried out for causing an interactive search session with a user, the process comprising: receiving a search query from a device, the search query provided by a user; and engaging in an interactive chat session with the user of the device, the interactive chat session is to at least in part receive contextual cues about the search query, wherein an Artificial Intelligence (AI) architecture is to select actions that are translated to system generated messages during the interactive chat session.

Example 26 includes the subject matter of Example 25, the process comprising: receiving a user response during a cycle of the interactive chat session; selecting, by the AI architecture, an action of a plurality of actions, based on the user response; translating the selected action to a system generated message; and transmitting the system generated message to the device, for displaying on the device.

Example 27 includes the subject matter of Example 26, the process comprising: iteratively repeating receiving a user response, selecting a corresponding action of the plurality of actions, translating the selected action, and transmitting a system generated message, until an end of the interactive chat session.

Example 28 includes the subject matter of any of Examples 26-27, wherein the selected action is to one of: request additional information about the search query, or request to refine the search query.

Example 29 includes the subject matter of any of Examples 25-28, the process comprising: causing the device to display the interactive chat session on the device, simultaneously with display of search results on the device.

Example 30 includes the subject matter of Example 29, the process comprising: dynamically updating the search results with a progress of the interactive chat session.

Example 31 includes the subject matter of any of Examples 25-30, wherein the AI architecture comprises a Reinforcement Learning (RL) model that operates on an Asynchronous Advantage Actor-Critic (A3C) algorithm.

Example 32 includes a method for providing an interactive search session, the method comprising: receiving, at a search engine, a search query from a device, the search query provided by a user, the search engine configured with a Reinforcement Learning (RL)-based agent programmed to interact with the user, to help the user in refining the search query by providing the user with contextual assistance; generating, by the RL-based agent and based at least in part on the search query, a vector representation of a plurality of values corresponding to a plurality of possible actions that the search engine can take in response to the search query, each of the possible actions associated with a corresponding one of the values that indicates a rank of that action relative to the other possible actions, wherein a given value encodes a sequential aggregation of one or both agent and user actions in last k cycles of the search session to capture both a local context and a global context, wherein one cycle of the search session includes a first action by the user and a second action by the search engine, and the local context includes a current cycle and/or a just previous cycle, and the global context includes one or more relatively older historical cycles not reflected in the local context; selecting, by the RL-based agent, an action from the possible actions, based at least in part on the value corresponding to the selected action; transmitting, by the search engine, a message to the device, for displaying on the device, the message based at least in part on the selected action, wherein the message is different from results of the search query and solicits further action from the user; and refining the search query based at least in part on action by the user that is responsive to the message.

Example 33 includes the subject matter of Example 32, wherein the selected action is a first selected action, the method further comprising: receiving, by the search engine, a user response to the message from the device; generating, by the RL agent and based at least in part on the user response, another vector representation of a plurality of values corresponding to a plurality of possible actions that the search engine can take in response to the user response, each of the actions associated with a corresponding one of said values that reflects one or both agent and user actions in the most recent cycle of the search session; selecting, by the RL agent, a second action from the possible actions, based at least in part on the value corresponding to the second selected action; and transmitting, by the search engine, another message to the device, based at least in part on the second selected action.

Example 34 includes the subject matter of Example 33, further comprising: iteratively repeating receiving a user response, generating another vector, selecting a corresponding action from the possible actions, and transmitting a corresponding message to the device, until an end of the search session is identified.

Example 35 includes the subject matter any of Examples 32-34, wherein the selected action and the message are to request additional information about the search query, or to request to refine the search query.

Example 36 includes the subject matter of any of Examples 32-35, further comprising: retrieving, by the search engine and from one or more databases, search results responsive to the search query; and providing, by the search engine, the search results to the device to cause display of the search results on the device simultaneously with a display of the message on the device.

Example 37 includes the subject matter of any of Examples 32-36, wherein the RL-based agent comprises an artificial intelligence model that is trained artificially through a virtual user.

Example 38 includes the subject matter of any of Examples 32-37, wherein the RL-based agent operates on an Asynchronous Advantage Actor-Critic (A3C) algorithm that generates an actor output and a critic output, the actor output including the possible actions and the critic output including a state of the search session, the state encoding the agent actions and user actions in the last k cycles of the search session.

Example 39 includes the subject matter of any of Examples 32-38, further comprising: training the RL-based agent by causing the RL-based agent to interact with a virtual user, wherein the virtual user is modelled using conversation history of the RL-based agent with one or more actual users.

Example 40 includes the subject matter of any of Examples 32-39, further comprising: training the RL-based agent using rewards, wherein rewards awarded during a search episode include a first reward for successful completion of the search episode, a second reward, based on user response to an action selected by the RL-based agent, and a third reward for completion of an auxiliary task identified by the RL-based agent, wherein a training episode includes a sequence of interactions between a virtual user and the RL-based agent.

Example 41 includes the subject matter of any of Examples 32-40, further comprising: iteratively repeating generating a vector and selecting a corresponding action; and defining, at each cycle of the search session, a corresponding state of the RL-based agent, wherein the state at a specific cycle includes one or more of at least a partial history of actions selected so far in the search session, at least a partial history of responses received from the device so far in the search session, and/or a length of the search session so far.

Example 42 includes the subject matter of Example 41, wherein at least the partial history of actions selected so far in the search session comprises a plurality of action vectors, wherein each action vector is indicative of a corresponding action undertaken during a corresponding cycle of the search session.

Example 43 includes the subject matter of any of Examples 41-42, wherein at least the partial history of responses received from the device so far in the search session comprises a plurality of user vectors, wherein each user vector is indicative of a corresponding response received during a corresponding cycle of the search session.

Example 44 includes a system comprising: one or more processors; a processing module executable by the one or more processors to receive a user message from a device and to parse the user message, the user message comprising at least one of: a search query, or a response from a user during an interaction of the user with the system, the interaction is to generate results of the search query; a search engine to receive the parsed user message, and to generate search results based on the parsed user message; and an artificial intelligence module executable by the one or more processors to receive the parsed user message and the search results, generate a vector representation of a plurality of values corresponding to a plurality of possible actions that the system can take, based at least in part on the parsed user message and the search results, each of the possible actions associated with a corresponding one of the values that indicates a rank of that action relative to the other possible actions, and select a first action of the possible actions, based at least in part on a value corresponding to the selected action.

Example 45 includes the subject matter of Example 44, wherein the processing module is a natural language processing (NLP) module, and wherein processing module is to: receive an indication of the selection of the first action of the possible actions; generate a system message, based on the indication of the selection of the first action; and cause the system message to be transmitted to the device, for displaying on the device.

Example 46 includes the subject matter of Example 45, wherein the system message includes at least one of the search results, a request for more information about the search query, a request to refine the search query, and/or a request to select one of a plurality of categories of results of the search query.

Example 47 includes the subject matter of any of Examples 44-46, wherein: the artificial intelligence module implements a Reinforcement Learning (RL) model that operates on an Asynchronous Advantage Actor-Critic (A3C) algorithm; and the artificial intelligence module is to train the RL model by causing the RL model to interact with a virtual user, wherein the virtual user is modelled using conversation history of the RL model with one or more real users.

Example 48 includes the subject matter of Example 47, wherein the artificial intelligence module is to: train the RL model using rewards, wherein rewards awarded during a search episode include a first reward for successful completion of the search episode, a second reward, based on user response to an action selected by the RL model, and a third reward for completion of an auxiliary task identified by the RL model.

Example 49 includes a computer program product including one or more non-transitory machine-readable mediums encoded with instructions that when executed by one or more processors cause a process to be carried out for causing an interactive search session with a user, the process comprising: receiving a search query from a device, the search query provided by a user; generating, based at least in part on the search query, a plurality of values corresponding to a plurality of possible actions that can be taken in response to the search query, each of the possible actions associated with a corresponding one of the values that indicates a rank of that action relative to the other possible actions; selecting an action from the possible actions, based at least in part on the value corresponding to the selected action being a maximum among the plurality of values; transmitting a message to the device, for displaying on the device, the message based at least in part on the selected action; and refining the search query based at least in part on a user response to the message.

Example 50 includes the subject matter of Example 49, the process comprising: receiving the user response to the message; selecting another action of the possible actions, based on the user response; and transmitting another message to the device, for displaying on the device, the another message based at least in part on the selected another action.

Example 51 includes the subject matter of Example 50, the process comprising: iteratively repeating receiving a user response, selecting a corresponding action of the possible actions, and transmitting a corresponding message, to engage in an interactive chat session with the user, the interactive chat session is to at least in part receive contextual cues about the search query.

The foregoing detailed description has been presented for illustration. It is not intended to be exhaustive or to limit the disclosure to the precise form described. Many modifications and variations are possible in light of this disclosure. Therefore, it is intended that the scope of this application be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. A method for providing an interactive search session, the method comprising:
    receiving, at a search engine, a search query from a device, the search query provided by a user, the search engine configured with a Reinforcement Learning (RL)-based agent programmed to interact with the user and to help the user refine the search query by providing the user with contextual assistance;
    training the RL-based agent using rewards awarded during a training episode, wherein the training episode includes a sequence of interactions between a virtual user and the RL-based agent, and wherein the rewards include (a) a first reward for successful completion of the training episode, (b) a second reward based on a user response to a training action selected by the RL-based agent, and (c) a third reward for completion of an auxiliary task identified by the RL-based agent;
    generating, by the RL-based agent and based at least in part on the search query, a vector representation of a plurality of values corresponding to a plurality of possible actions that the search engine can take in response to the search query, each of the possible actions associated with one of the values that indicates a rank of that action relative to other of the plurality of possible actions, wherein a given value encodes a sequential aggregation of one or both agent and user actions in a last k cycles of the search session to capture both a local context and a global context, wherein one cycle of the search session includes a first action by the user and a second action by the search engine, wherein the local context includes at least one of a current cycle or a just previous cycle, and wherein the global context includes one or more relatively older historical cycles not reflected in the local context;
    selecting, by the RL-based agent, an action from the possible actions, based at least in part on the value corresponding to the selected action;
    transmitting, by the search engine, a message to the device, for displaying on the device, the message based at least in part on the selected action, wherein the message is different from results of the search query and solicits further action from the user; and
    refining the search query based at least in part on action by the user that is responsive to the message.

2. The method of claim 1, wherein the selected action is a first selected action, the method further comprising:
    receiving, by the search engine, a user response to the message from the device;
    generating, by the RL-based agent and based at least in part on the user response, an additional vector representation of an additional plurality of values corresponding to an additional plurality of possible actions that the search engine can take in response to the user response, each of the additional possible actions associated with a corresponding one of the additional values that reflects one or both agent and user actions in a most recent cycle of the search session;
    selecting, by the RL-based agent, a second action from the additional possible actions, based at least in part on the additional value corresponding to the second selected action; and
    transmitting, by the search engine, an additional message to the device, based at least in part on the second selected action.

3. The method of claim 2, further comprising iteratively repeating receiving another user response, generating another vector representation, selecting another action, and transmitting another message to the device, until an end of the search session is identified.

4. The method of claim 1, wherein the selected action and the message are to request additional information about the search query, or to request to refine the search query.

5. The method of claim 1, further comprising:
retrieving, by the search engine and from one or more databases, search results responsive to the search query; and
providing, by the search engine, the search results to the device to cause display of the search results on the device simultaneously with a display of the message on the device.

6. The method of claim 1, wherein the RL-based agent comprises an artificial intelligence model that is trained artificially through the virtual user.

7. The method of claim 1, wherein the RL-based agent operates on an Asynchronous Advantage Actor-Critic (A3C) algorithm that generates an actor output and a critic output, the actor output including the possible actions and the critic output including a state of the search session, the state encoding agent actions and user actions in the last k cycles of the search session.

8. The method of claim 1, wherein the virtual user is modelled using conversation history of the RL-based agent with one or more actual users.

9. The method of claim 1, further comprising:
iteratively repeating generating another vector representation and selecting another action; and
defining, at each cycle of the search session, a corresponding state of the RL-based agent, wherein the state at a specific cycle includes one or more of
at least a partial history of actions selected so far in the search session,
at least a partial history of responses received from the device so far in the search session, and/or
a length of the search session so far.

10. The method of claim 9, wherein:
the partial history of actions selected so far in the search session comprises a plurality of action vectors, and
each action vector is indicative of a corresponding action undertaken during a corresponding cycle of the search session.

11. The method of claim 9, wherein:
the partial history of responses received from the device so far in the search session comprises a plurality of user vectors, and
each user vector is indicative of a corresponding response received during a corresponding cycle of the search session.

12. A system comprising:
one or more processors;
a processing module executable by the one or more processors to receive a user message from a device and to parse the user message, the user message comprising input that, when processed by a search engine, generates search results; and
an artificial intelligence module executable by the one or more processors to
implement a reinforcement learning (RL) model that operates on an asynchronous advantage actor-critic algorithm,
train the RL model by causing the RL model to interact with a virtual user that is modeled using conversation history of the RL model with one or more real users, wherein the RL model is trained using rewards awarded during a training episode including (a) a first reward for successful completion of the training episode, (b) a second reward based on user response to a particular action selected by the RL model, and (c) a third reward for completion of an auxiliary task identified by the RL model,
receive the parsed user message and the search results,
use the RL model to generate a vector representation of a plurality of values corresponding to a plurality of possible actions that the system can take, based at least in part on the parsed user message and the search results, each of the possible actions associated with one of the values that indicates a rank of that action relative to other of the plurality of possible actions, and
select a first action of the possible actions, based at least in part on the value corresponding to the selected first action.

13. The system of claim 12, wherein the processing module is a natural language processing (NLP) module, and wherein the processing module is to:
receive an indication of a selection of the first action of the possible actions;
generate a system message, based on the indication of the selection of the first action; and
cause the system message to be transmitted to the device, for displaying on the device.

14. The system of claim 13, wherein the system message includes at least one of the search results, a request for more information about the user message, a request to refine the user message, or a request to select one of a plurality of categories of results of the user message.

15. A computer program product including one or more non-transitory machine-readable mediums encoded with instructions that, when executed by one or more processors, cause a process to be carried out for causing an interactive search session with a user, the process comprising:
receiving a user message from a device;
parsing the user message, the user message comprising input that, when processed by a search engine, generates search results;
implementing a reinforcement learning (RL) model that operates on an asynchronous advantage actor-critic (A3C) algorithm;
training the RL model by causing the RL model to interact with a virtual user that is modeled using conversation history of the RL model with one or more real users, wherein the RL model is trained using rewards awarded during a training episode including (a) a first reward for successful completion of the training episode, (b) a second reward based on user response to a particular action selected by the RL model, and (c) a third reward for completion of an auxiliary task identified by the RL model;
receiving the parsed user message and the search results;
using the RL model to generate a vector representation of a plurality of values corresponding to a plurality of possible actions that can be taken, based at least in part on the parsed user message and the search results, each of the possible actions associated with one of the values that indicates a rank of that action relative to other of the plurality of possible actions; and
selecting a first action of the possible actions, based at least in part on the value corresponding to the selected first action.

16. The computer program product of claim 15, wherein the A3C algorithm generates an actor output and a critic output, the actor output including the possible actions and the critic output including a state of the search session.

17. The computer program product of claim 15, the process further comprising:
- generating a system message, based on selection of the first action; and
- causing the system message to be transmitted to the device, for displaying on the device.

18. The computer program product of claim 17, wherein the selected first action and the system message are to request additional information about the user message.

19. The computer program product of claim 17, wherein the selected first action and the system message are to request to refine the user message.

20. The computer program product of claim 17, wherein the system message includes at least one of the search results, a request for more information about the user message, a request to refine the user message, or a request to select one of a plurality of categories of results of the user message.

\* \* \* \* \*